US010854241B2

(12) United States Patent
Deora et al.

(10) Patent No.: US 10,854,241 B2
(45) Date of Patent: Dec. 1, 2020

(54) GENERATION OF MEDIA DIFF FILES

(71) Applicant: Citrix Systems, Inc., Fort Lauderdale, FL (US)

(72) Inventors: Divyansh Deora, Bangalore (IN); Arnav Akhoury, Bangalore (IN); Nandikotkur Achyuth, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 16/402,908

(22) Filed: May 3, 2019

(65) Prior Publication Data
US 2020/0349972 A1 Nov. 5, 2020

(51) Int. Cl.
*G11B 27/031* (2006.01)
*H04N 21/2343* (2011.01)
*G06K 9/00* (2006.01)

(52) U.S. Cl.
CPC ........ *G11B 27/031* (2013.01); *G06K 9/00758* (2013.01); *H04N 21/23439* (2013.01)

(58) Field of Classification Search
CPC ............. G11B 27/031; G06K 9/00758; H04N 21/23439
See application file for complete search history.

(56) References Cited

U.S. PATENT DOCUMENTS

| 2004/0161039 A1* | 8/2004 | Grundstrom | H04N 19/61 375/240.24 |
| 2007/0299886 A1* | 12/2007 | Novak | G06F 16/178 |
| 2016/0300110 A1* | 10/2016 | Prosek | G06K 9/6218 |
| 2018/0199081 A1* | 7/2018 | Silverman | H04N 21/43615 |
| 2019/0220671 A1* | 7/2019 | Slipenchuk | G06K 9/00744 |

* cited by examiner

*Primary Examiner* — Thai Q Tran
*Assistant Examiner* — Sunghyoun Park
(74) *Attorney, Agent, or Firm* — Pierce Atwood LLP

(57) ABSTRACT

A method is disclosed in which first payload data included in a first file container and second payload data included in a second file container are determined. The first payload data is decoded to determine first un-encoded data representing first content, and the second payload data is decoded to determine second un-encoded data representing second content. At least one difference is determined between the first un-encoded data and the second un-encoded data, and third un-encoded data corresponding to the at least one difference is determined. The third un-encoded data is encoded to generate third payload data representing third content, and a third file container is generated that includes the third payload data.

20 Claims, 14 Drawing Sheets

US 10,854,241 B2

GENERATION OF MEDIA DIFF FILES

BACKGROUND

Various file sharing systems have been developed that allow users to store and/or retrieve files or other data to and/or from a repository. ShareFile®, offered by Citrix Systems, Inc., of Fort Lauderdale, Fla., is one example of a system that provides such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining first payload data included in a first file container, wherein the first payload data represents first content, and determining second payload data included in a second file container, wherein the second payload data represents second content. The first payload data is decoded to determine first un-encoded data representing the first content, and the second payload data is decoded to determine second un-encoded data representing the second content. At least one difference is determined between the first un-encoded data and the second un-encoded data, and third un-encoded data corresponding to the at least one difference is determined. The third un-encoded data is encoded to generate third payload data representing third content, and a third file container is generated that includes the third payload data.

In other disclosed embodiments, at least one computer-readable medium is encoded with instructions which, when executed by at least one processor, cause the at least one processor to determine first payload data included in a first file container, wherein the first payload data represents first content; decode the first payload data to determine first un-encoded data representing the first content; determine second payload data included in a second file container, wherein the second payload data represents second content; decode the second payload data to determine second un-encoded data representing the second content; determine at least one difference between the first un-encoded data and the second un-encoded data; determine third un-encoded data corresponding to the at least one difference; encode the third un-encoded data to generate third payload data representing third content; and generate a third file container that includes the third payload data.

In yet other disclosed embodiments, a method involves determining first payload data included in a first file container, wherein the first payload data represents first non-textual media content, and determining second payload data included in a second file container, wherein the second payload data represents second non-textual media content. At least one difference between the first non-textual media content and second the second non-textual media content is determined using the first payload data and the second payload data. Third payload data is determined that represents third non-textual media content corresponding to the at least one difference, and a third file container is generated that includes the third payload data.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Various circumstances exist in which two media files may represent both overlapping and differing content. For example, a first multi-media file (e.g., an MP4 file) may represent a first version of a movie and a second multi-media file may represent a second version of the same movie that has been modified in some way, e.g., an entire scene may have been added or deleted, one or more video frames may have been added, deleted or modified, one or more samples in an audio channel may have been added, deleted or modified, etc. The inventors have recognized and appreciated that it would be desirable to allow the differences between two such media files to be readily ascertained by a user.

Offered is a technique and system in which differences between the media content represented by two media files may be determined, and in which one or more new media files may be generated that include media content representing such differences. Such new media files are sometimes referred to herein as "difference" or "diff" files. A user may then access the diff media file(s) (e.g., by playing an MP4 file including added, deleted, or modified segments of audio and/or video content) to readily ascertain the differences between the two compared media files.

For purposes of reading the description of the various embodiments below, the following descriptions of the sections of the specification and their respective contents may be helpful:

Section A provides an introduction to an example embodiment of a media file comparison system (MFCS) configured in accordance with the present disclosure;

Section B describes a network environment and computing environment which may be useful for practicing embodiments described herein;

Section C describes embodiments of systems and methods for enabling file sharing over one or more networks;

Section D provides a detailed description of example embodiments of a media file comparison system (MFCS) configured in accordance with the present disclosure; and Section E describes example implementations of methods, systems, and computer-readable media in accordance with the present disclosure.

A. Introduction to an Illustrative Embodiment of a Media File Comparison System (MFCS)

Figure 1:
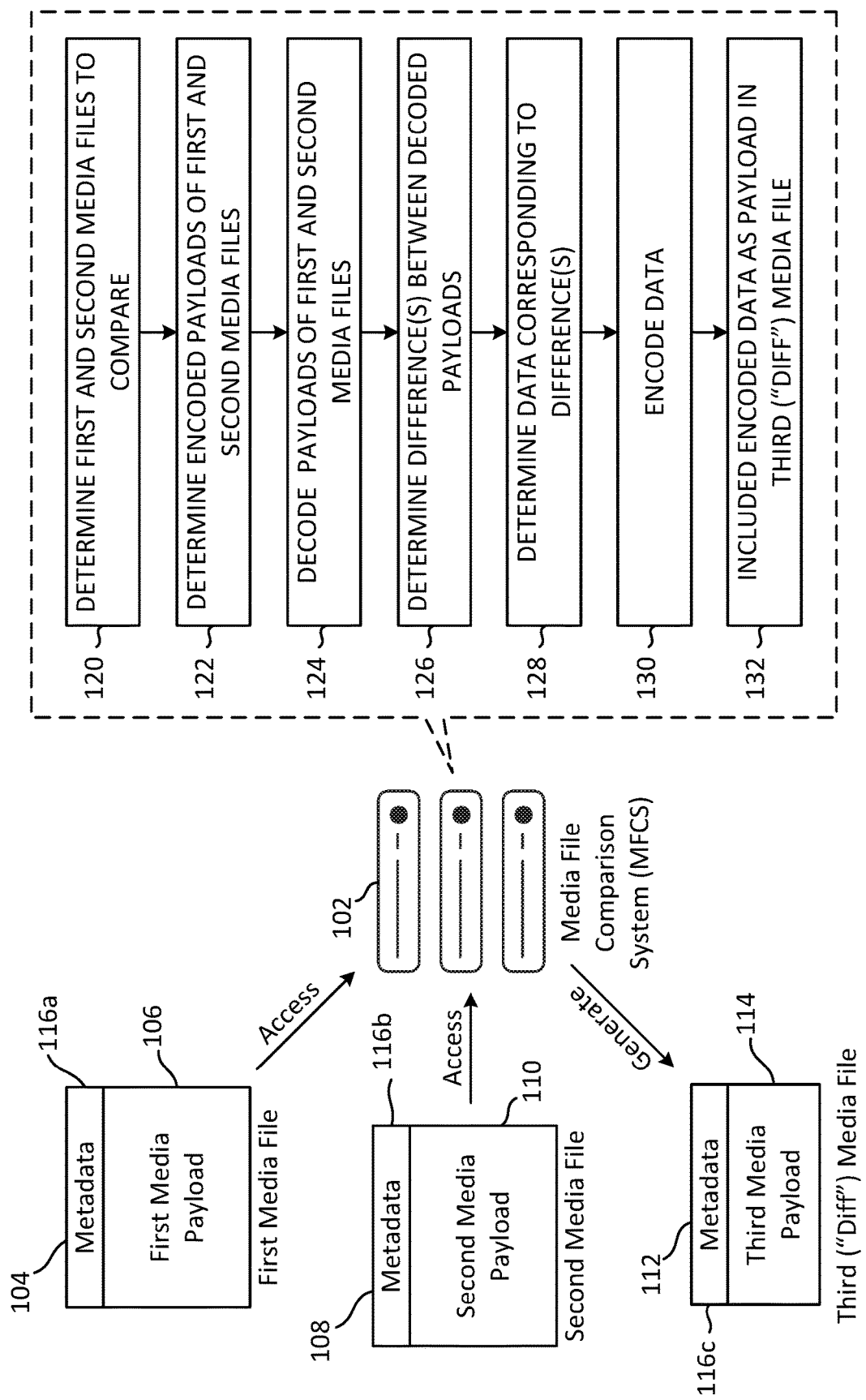
FIG. 1 is a diagram illustrating certain features of an embodiment of a media file comparison system (MFCS) configured in accordance with the present disclosure.

FIG. 1 shows an example of a media file comparison system (MFCS) 102 that may be used to implement various aspects of the present disclosure. Although FIG. 1 illustrates the MFCS 102 as including just three servers, it should be appreciated that the MFCS 102 may include any number of servers (including only a single server) as well as any number of additional or different components, such as one or more databases, other network components, etc. As explained in more detail below, the MFCS 102 may access a first media file 104 including a first media payload 106 and a second media file 108 including a second media payload 110, and may generate a third media file 112, sometimes referred to herein as a "difference" or "diff" file, that includes a third media payload 114 that is based on a comparison of the first media payload 106 and the second media payload 110. As shown in FIG. 1, each of the media files 104, 108, 112 may additionally include metadata 116a, 116b, 116c that defines how different elements of data and metadata coexist within the files 104, 108, 112.

In some embodiments, each of the media files 104, 108, 112 may correspond to a particular type of media container file. Such container files may, for example, be used to identify and interleave different data types. Simpler container formats may, for example, contain different types of audio formats, while more advanced container formats may support multiple audio and video streams, subtitles, chapter information, and metadata (tags) along with the synchronization information needed to play back the various streams together.

Container format parts may have various names: "chunks" as in RIFF and PNG, "atoms" in QuickTime/MP4, "packets" in MPEG-TS (from the communications term), and "segments" in JPEG. The main content of a chunk is called the "payload." Most container formats have chunks in sequence, each with a header, while TIFF (Tagged Image File Format) instead stores offsets. Modular chunks make it easy to recover other chunks in case of file corruption or dropped frames or bit slip, while offsets may result in framing errors in cases of bit slip. Some containers are exclusive to audio. Examples of such audio containers are AIFF (IFF file format, widely used on Mac OS platform), WAV (RIFF file format, widely used on Windows platform), and XMF (Extensible Music Format). Other containers are exclusive to still images. Examples of such still image containers include FITS (Flexible Image Transport System), and associated metadata, and TIFF.

Other flexible containers may hold many types of audio and video, as well as other media. Examples of such multi-media containers include: 3GP (used by many mobile phones; based on the ISO base media file format); ASF (container for Microsoft WMA and WMV); AVI (the standard Microsoft Windows container, also based on RIFF); DVR-MS ("Microsoft Digital Video Recording," proprietary video container format developed by Microsoft based on ASF); Flash Video (FLV, F4V) (container for video and audio from Adobe Systems); IFF (first platform-independent container format); Matroska (MKV) (not limited to any coding format, as it can hold virtually anything; it is an open standard container format); MJ2—Motion JPEG 2000 file format, based on the ISO base media file format which is defined in MPEG-4 Part 12 and JPEG 2000 Part 12; Quick-Time File Format (standard QuickTime video container from Apple Inc.); MPEG program stream (standard container for MPEG-1 and MPEG-2 elementary streams on reasonably reliable media such as disks; used also on DVD-Video discs); MPEG-2 transport stream (or MPEG-TS) (standard container for digital broadcasting and for transportation over unreliable media; used also on Blu-ray Disc video; typically contains multiple video and audio streams, and an electronic program guide); MP4 (standard audio and video container for the MPEG-4 multimedia portfolio, based on the ISO base media file format defined in MPEG-4 Part 12 and JPEG 2000 Part 12) which in turn was based on the QuickTime file format; Ogg (standard container for Xiph.org audio formats Vorbis and Opus and video format Theora); and RM (RealMedia; standard container for RealVideo and RealAudio).

Other examples of container formats include NUT, MXF, GXF, ratDVD, SVI, VOB, and DivX Media Format. Further, in addition to pure container formats, which specify only the wrapper but not the coding, a number of file formats specify both a storage layer and the coding, as part of modular design and forward compatibility. Examples include JPEG File Interchange Format (JFIF) for containing JPEG data, and Portable Network Graphics (PNG). In principle, coding can be changed while the storage layer is retained; for example, Multiple-image Network Graphics (MNG) uses the PNG container format but provides animation, while JPEG Network Graphics (JNG) puts JPEG encoded data in a PNG container; in both cases however, the different formats have different magic numbers—the format specifies the coding, though a MNG can contain both PNG-encoded images and JPEG-encoded images.

As shown in FIG. 1, the MFCS 102 may determine (at a step 120) the first media file 104 and the second media file 108 that are to be compared. The determination of step 120 may be made in any of numerous ways and in any of a number of circumstances. In some embodiments, for example, a user of a computing device (not shown in FIG. 1) may have caused the computing device to check out the first media file 104 from a repository and then used the computing device to make one or more changes to the first media payload 106 (e.g., audio, video, or other media payload) of the first media file 104. In such a circumstance, the second media file 108 shown in FIG. 1 (and referenced at step 120) may correspond to the modified version of the first media file 104. The user may then use the computing device to check the second media file 108 into the repository and the determination at the step 120 may be made in response to the repository receiving such a file check in request.

In other embodiments, a computing device operated by a user may have access to a list of media files stored in one or more repositories accessible by the MFCS 102 and may simply select first and second stored media files that are to be compared. In such a circumstance, the first media file 104 and the second media file 108 shown in FIG. 1 (and referenced at step 120) may correspond to the two files that are so selected.

In yet other embodiments, a computing device may have both of the first media file 104 and the second media file 108 stored on it and may cause both files to be sent to the MFCS 102 for comparison. In such a circumstance, the first media file 104 and the second media file 108 shown in FIG. 1 (and referenced at step 120) may correspond to the two files that are sent to the MFCS 102 along with an instruction to compare them.

In still other embodiments, the MFCS 102 may itself be a computing device operated by a user and the first and second media files referenced at step 120 of FIG. 1 may be stored on the computing device, or in one or more repositories accessible to the computing device, and the determination of step 120 may be performed by the computing device based on input from the user indicating that the two files are to be compared.

As shown in FIG. 1, at a step 122, the MFCS 102 may examine the first and second media files 104, 108 to determine portions of the files that correspond to encoded payloads of a particular media type, e.g., a video payload, a payload for an audio channel, or a payload for a still image.

At a step 124, the determined encoded payloads may then be decoded to yield uncompressed binary data representing the media corresponding to the payload, e.g., a sequence of video frames, a sequence of audio samples, or an image bit map.

At a step 126, the MFCS 102 may compare the decoded payloads to identify differences between them. For example, in some embodiments, the MFCS 102 may determine that one of the first and second un-encoded payloads represents one or more video frames, audio samples, or pixel values that is not included in the other. Example techniques for performing such comparisons on a variety of media payload types are provided below.

At a step 128, the MFCS 102 may determine one or more portions of the first and/or second un-encoded payloads that correspond to the identified differences. For example, the MFCS 102 may identify a sequence of video frames that was represented in a second video payload and not a first video payload, may identify a sequence of audio samples that was represented in a second audio payload and not in a first audio payload, or may identify a group of pixel values that was represented in a second still image payload and not in a first still image payload.

At a step 130, the MFCS 102 may encode the data determined at the step 128 to form a new payload representing the determined difference between the represented media and, at a step 132, may include the new payload in a third, or "diff," media file 112 that is preferably of a type that is the same or similar to the types of the first and second media files 104, 108 that were compared. For example, if the first and second media files 104, 108 are MP4 files, then the diff file 112 may also be an MP4 file. Once generated, the diff file 112 may be played or otherwise accessed by a computing device operated by a user so as to provide the user with a media experience from which the differences between the content represented by the first and second media payloads may be readily ascertained, such as by displaying a video corresponding to one or more added or deleted scenes, by outputting audio corresponding to one or more added or deleted audio segments, by displaying an image corresponding to one or more added or deleted image regions, etc.

Additional details and example implementations of embodiments of the present disclosure are set forth below in Section D, following a description of example systems and network environments in which such embodiments may be deployed.

B. Network and Computing Environment

Figure 2A:
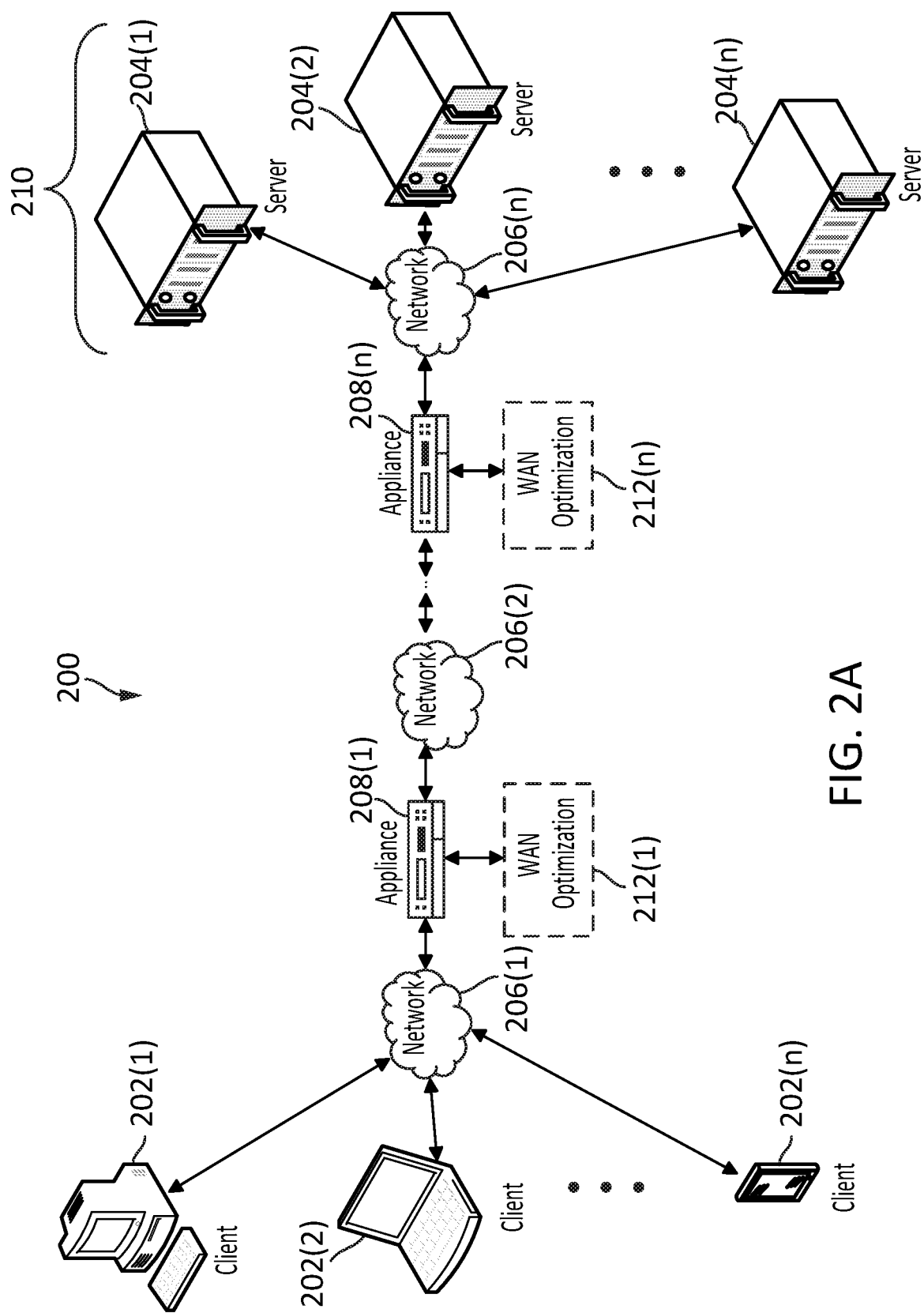
FIG. 2A is a diagram of a network computing environment in which some embodiments of the media file comparison techniques disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208).

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another. For example, in some embodiments, one server farm 210 may operate as a file containerization and management system (MFCS) 102 (as disclosed herein) and another server farm 210 may operate as an application server system (described in more detail below), with one or more servers 204 of the application serving system providing a virtual computing environment to a client 202 and also receiving a containerized file from the MFCS 102 on behalf of the client 202.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
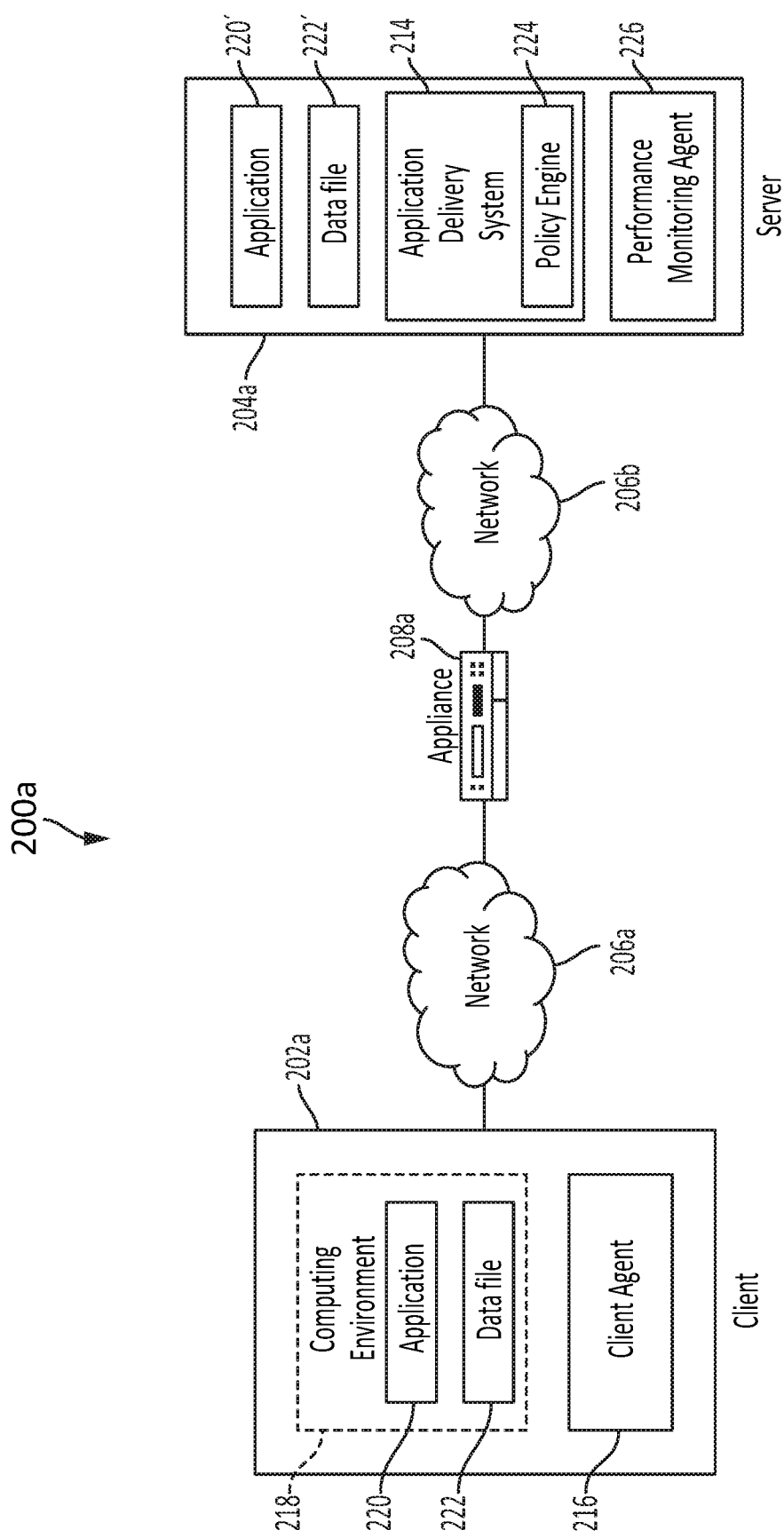
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform end-point detection/scanning and/or collect end-point information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202*a*, for example by the application delivery system 214. For example, the appliance 208*a* may accelerate delivery of a streaming application 220' and data file 222' processable by the application 220 from a data center to a remote user location by accelerating transport layer traffic between the client 202*a* and the server 204*a*. Such acceleration may be provided by one or more techniques, such as: 1) transport layer connection pooling, 2) transport layer connection multiplexing, 3) transport control protocol buffering, 4) compression, 5) caching, or other techniques. The appliance 208*a* may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202*a*), remote or otherwise, based on authentication and authorization policies applied by a policy engine 224. A remote user may obtain a computing environment and access to server stored applications 220' and data files 222' from any network-connected device (e.g., the client 202*a*). For example, the appliance 208*a* may request an application 220' and data file 222' from the server 204*a*. In response to the request, the application delivery system 214 and/or the server 204*a* may deliver the application 220' and data file 222' to the client 202*a*, for example via an application stream to operate in the computing environment 218 on client the 202*a*, or via a remote-display protocol or otherwise via remote-based or server-based computing. In an embodiment, application delivery system 214 may be implemented as any portion of the Citrix Workspace™ by Citrix Systems, Inc., of Fort Lauderdale, Fla., such as Citrix Virtual Apps and Desktops™.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202*a* may request execution of an application (e.g., application 220') and the application delivery system 214 of the server 204*a* may determine how to execute the application 220', for example based upon credentials received from the client 202*a* and a user policy applied by the policy engine 224 associated with the credentials. For example, the application delivery system 214 may enable the client 202*a* to receive application-output data generated by execution of the application on the server 204*a*, may enable client the 202*a* to execute the application 220 locally after receiving the application from the server 204*a*, or may stream the application via one or more networks 206*a*, 206*b* to the client 202*a*. For example, in some embodiments, the application 220 may be a server-based or a remote-based application executed on the server 204*a* on behalf of the client 202*a*. The server 204*a* may display output to the client 202*a* using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200*a*. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

Figure 2C:
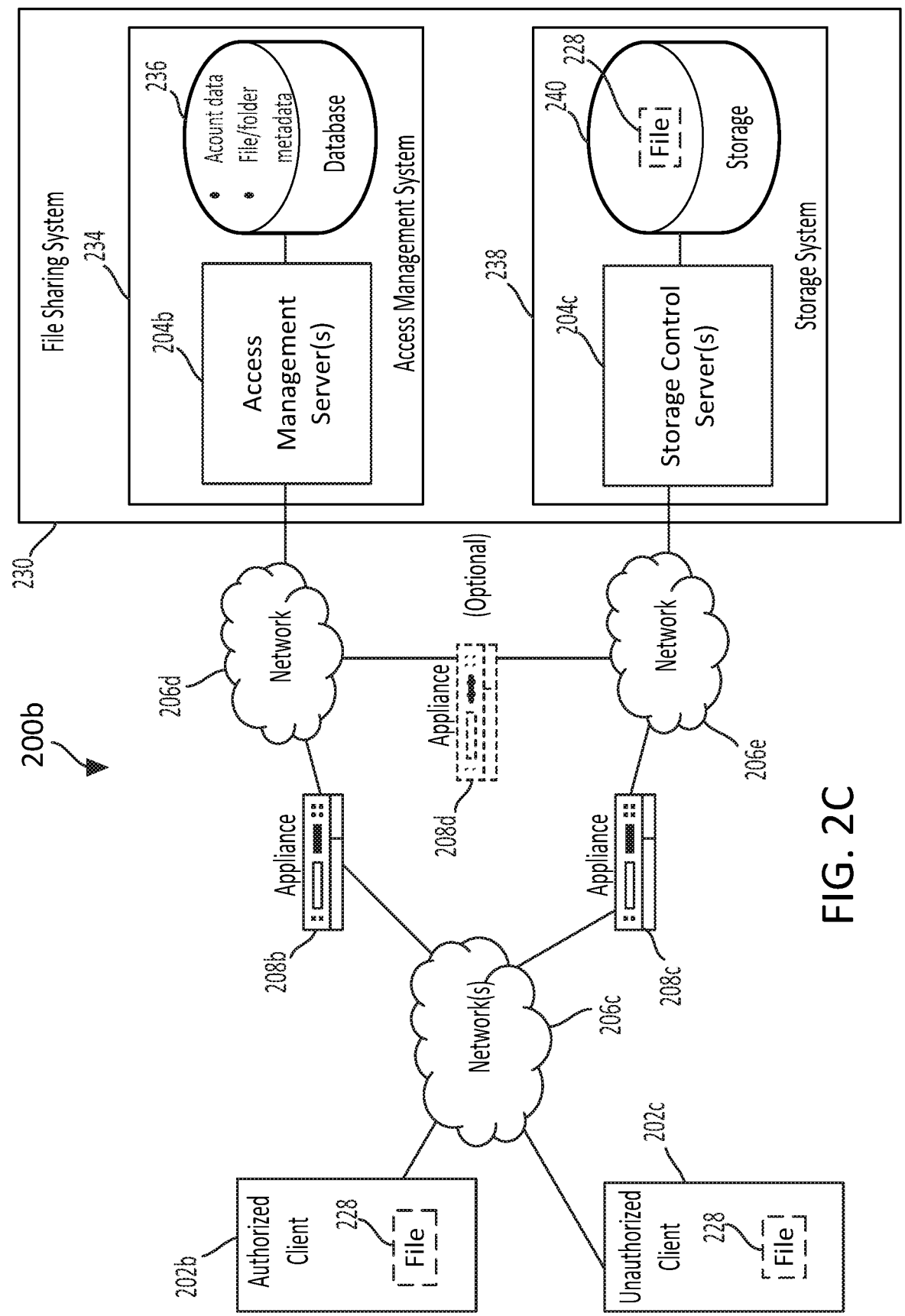
FIG. 2C is a diagram illustrating how a network computing environment like that shown in FIG. 2A may be configured to allow clients to access an example embodiment of a server-based file sharing system.

FIG. 2C shows an example network environment 200*b* for allowing an authorized client 202*b* and/or an unauthorized client 202*c* to upload a file 228 to a file sharing system 230 or download a file 228 from the file sharing system 230. The authorized client 202*b* may, for example, be a client 202 operated by a user having an active account with the file sharing system 230, while the unauthorized client 202*c* may be operated by a user who lacks such an account.

As FIG. 2C illustrates, in some embodiments, the file sharing system 230 may include an access management system 234 and a storage system 238. As shown, the access management system 234 may include one or more access management servers 204*b* and a database 236, and the storage system 238 may include one or more storage control servers 204*c* and a storage medium 240. In some embodiments, the access management server(s) 204*b* may, for example, allow a user of the client 202*b* to log in to his or her account, e.g., by entering a user name and password corresponding to account data stored in the database 236. Once the user of the client 202b has logged in, the access management server 204b may enable the user to view (via the authorized client 202b) information identifying various folders represented in the storage medium 240, which is managed by the storage control server(s) 204c, as well as any files 228 contained within such folders. File/folder metadata stored in the database 236 may be used to identify the files 228 and folders in the storage medium 240 to which a particular user has been provided access rights.

In some embodiments, the clients 202b, 202c may be connected to one or more networks 206c (which may include the Internet), the access management server(s) 204b may include webservers, and an appliance 208b may load balance requests from the authorized client 202b to such webservers. The database 236 associated with the access management server(s) 204b may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202b, 202c are shown is FIG. 2C as stand-alone computers, it should be appreciated that one or both of the clients 202b, 202c shown in FIG. 2C may instead represent other types of computing devices or systems that can be operated by users. In some embodiments, for example, one or both of the authorized client 202b and the unauthorized client 202c may be implemented as a server-based virtual computing environment that can be remotely accessed using a separate computing device operated by users, such as described above in connection with FIG. 2B.

In some embodiments, the access management system 234 may be logically separated from the storage system 238, such that files 228 and other data that are transferred between clients 202 and the storage system 238 do not pass through the access management system 234. Similar to the access management server(s) 204b, one or more appliances 208b-d may load-balance requests from the clients 202b, 202c received from the network(s) 206c (which may include the Internet) to the storage control server(s) 204c. In some embodiments, the storage control server(s) 204c and/or the storage medium 240 may be hosted by a cloud-based service provider (e.g., Amazon Web Services or Microsoft Azure). In other embodiments, the storage control server(s) 204c and/or the storage medium 240 may be located at a data center managed by an enterprise of a client 202, or may be distributed among some combination of a cloud-based system and an enterprise system, or elsewhere.

After a user of the authorized client 202b has properly logged in to an access management server 204b, the server 204b may receive a request from the client 202b for access to one of the files 228 or folders to which the logged in user has access rights. The request may either be for the authorized client 202b to itself to obtain access to a file 228 or folder or to provide such access to the unauthorized client 202c. In some embodiments, in response to receiving an access request from an authorized client, the access management server 204b may communicate with the storage control server(s) 204c (e.g., either over the Internet via appliances 208b and 208c or via an appliance 208d positioned between networks 206d and 206e) to obtain a token generated by the storage control server 204c that can subsequently be used to access the identified file 228 or folder.

In some embodiments, the generated token may, for example, be sent to the authorized client 202b, and the authorized client 202b may then send a request for a file 228, including the token, to the storage control server(s) 202c. In other embodiments, the authorized client 202b may send the generated token to the unauthorized client 202c so as to allow the unauthorized client 202c to send a request for the file 228, including the token, to the storage control server(s) 202c. In yet other embodiments, an access management server 204b may, at the direction of the authorized client 202b, send the generated token directly to the unauthorized client 202c so as to allow the unauthorized client 202c to send a request for the file 228, including the token, to the storage control server(s) 202c. In any of the forgoing scenarios, the request sent to the storage control server(s) may, in some embodiments, include a uniform resource locator (URL) that resolves to an internet protocol (IP) address of the storage control server(s) 202c, and the token may be appended to or otherwise accompany the URL. Accordingly, providing access to one or more clients 202 may be accomplished, for example, by causing the authorized client 202b to send a request to the URL address, or by sending an email, text message or other communication including the token-containing URL to the unauthorized client 202c, either directly from the access management server(s) 204b or indirectly from the access management server(s) 204b to the authorized client 202b and then from the authorized client 202b to the unauthorized client 202c. In some embodiments, selecting the URL or a user interface element corresponding to the URL, may cause a request to be sent to the storage control server(s) 204c that either causes a file 228 to be downloaded immediately to the client that sent the request, or may cause the storage control server 204c to return a webpage to the client that includes a link or other user interface element that can be selected to effect the download.

In some embodiments, a generated token can be used in a similar manner to allow either an authorized client 202b or an unauthorized client 202c to upload a file 228 to a folder corresponding to the token. In some embodiments, for example, an "upload" token can be generated as discussed above when an authorized client 202b is logged in and a designated folder is selected for uploading. Such a selection may, for example, cause a request to be sent to the access management server(s) 204b, and a webpage may be returned, along with the generated token, that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In some embodiments, sending a request including such a token to the storage control server(s) 204c (e.g., by selecting a URL or user-interface element included in an email inviting the user to upload one or more files 228 to the file sharing system 230), a webpage may be returned that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computer, a plurality of computers, or a network of distributed computers such as computer 246 shown in FIG. 2D.

Figure 2D:
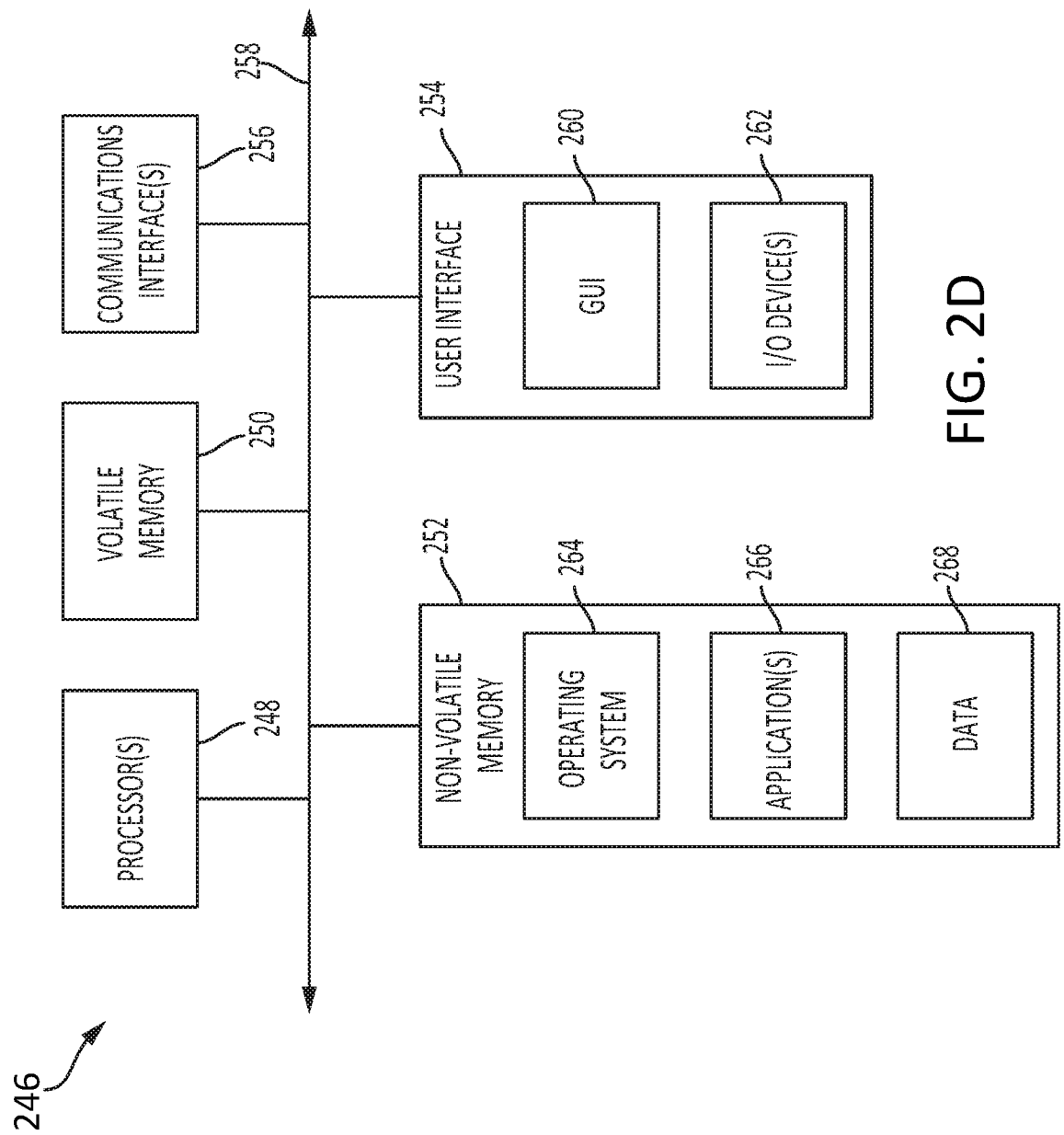
FIG. 2D is a block diagram of a computing device that may be used to implement one or more of the components of the computing environment shown in FIGS. 2A-C.

As shown in FIG. 2D, the computer 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computer 246 may communicate via communication the bus 258. The computer 246 as shown in FIG. 2D is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computer 246 to access a computer network such as a LAN, a WAN, or the Internet through a variety of wired and/or wireless or cellular connections.

As noted above, in some embodiments, one or more computers 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of one or more applications, one or more desktop applications, and one or more desktop sessions in which one or more applications may execute.

Additional details of the implementation and operation of the network environment 200, clients 202, servers 204, and appliances 208 and 212 may be as described in U.S. Pat. No. 9,338,345, issued Jan. 3, 2017 to Citrix Systems, Inc., of Fort Lauderdale, Fla., the teachings of which are hereby incorporated herein by reference in their entirety.

C. Systems and Methods for Providing File Sharing Over Network(s)

Figure 3A:
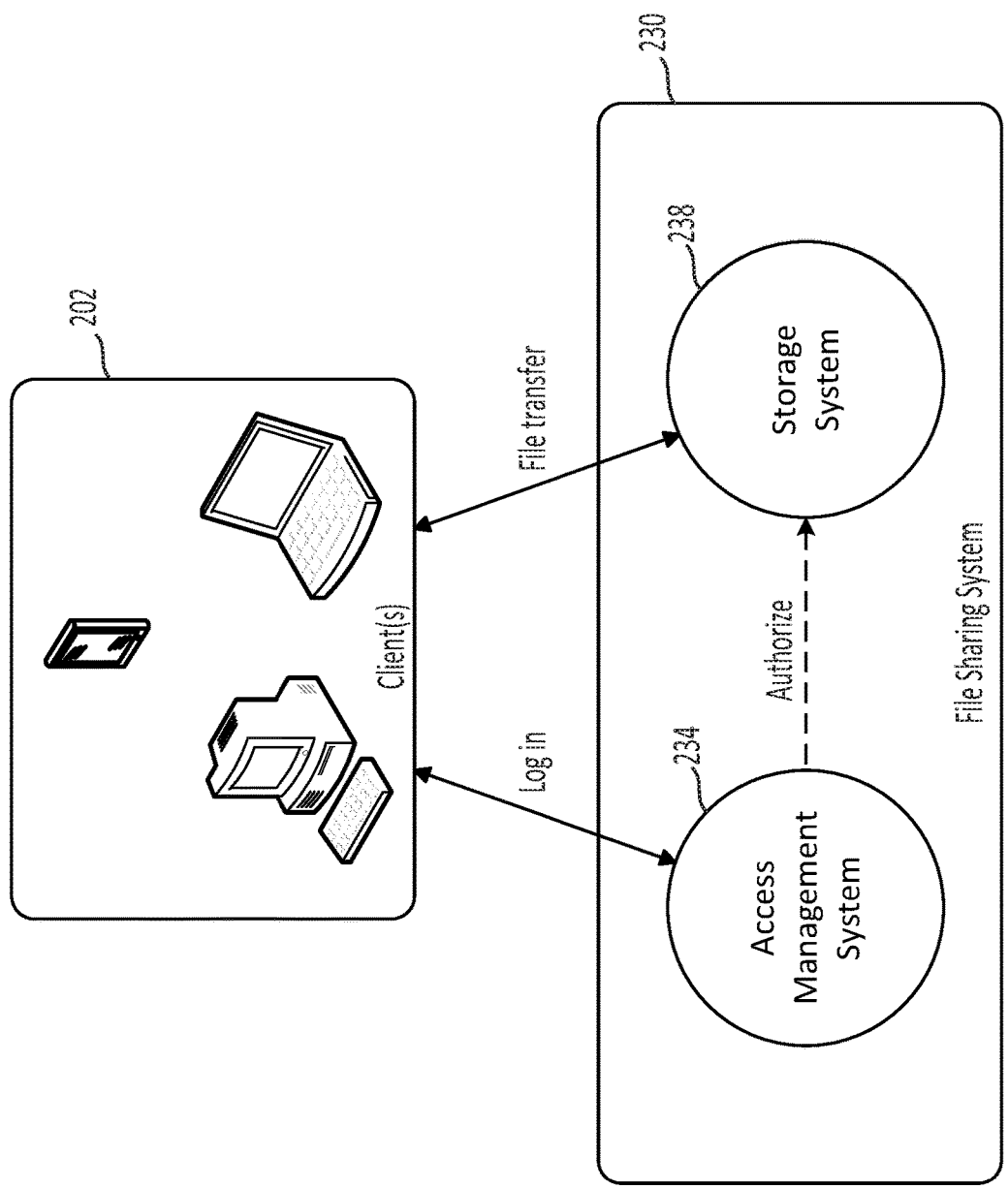
FIG. 3A is a diagram illustrating certain operations that may be performed by the file sharing system shown in FIG. 2C in accordance with some embodiments.

As discussed above in connection with FIG. 2C, in some embodiments, a file sharing system may be distributed between two sub-systems, with one subsystem (e.g., the access management system 234) being responsible for controlling access to files 228 stored in the other subsystem (e.g., the storage system 238). FIG. 3A illustrates conceptually how one or more clients 202 may interact with two such subsystems.

As shown in FIG. 3A, an authorized user operating a client 202, which may take on any of numerous forms, may log in to the access management system 234, for example, by entering a valid user name and password. In some embodiments, the access management system 234 may include one or more webservers that respond to requests from the client 202. The access management system 234 may store metadata concerning the identity and arrangements of files 228 (shown in FIG. 2C) stored by the storage system 238, such as folders maintained by the storage system 238 and any files 228 contained within such folders. In some embodiments, the metadata may also include permission metadata identifying the folders and files 228 each user is allowed to access. Once logged in, the user may employ a user-interface mechanism of the client 202 to navigate among folders for which the metadata indicates the user has access permission.

In some embodiments, the logged-in user may select a particular file 228 the user wants to access and/or to which the logged-in user wants a different user of a different client 202 to be able to access. Upon receiving such a selection from a client 202, the access management system 234 may take steps to authorize access to the selected file 228 by the logged-in client 202 and/or the different client 202. In some embodiments, for example, the access management system 234 may interact with the storage system 238 to obtain a unique "download" token which may subsequently be used by a client 202 to retrieve the identified file 228 from the storage system 238. The access management system 234 may, for example, send the download token to the logged-in client 202 and/or a client 202 operated by a different user. In some embodiments, the download token may a single-use token that expires after its first use.

In some embodiments, the storage system 238 may also include one or more webservers and may respond to requests from clients 202. In such embodiments, one or more files 228 may be transferred from the storage system 238 to a client 202 in response to a request that includes the download token. In some embodiments, for example, the download token may be appended to a URL that resolves to an IP address of the webserver(s) of the storage system 238. Access to a given file 228 may thus, for example, be enabled by a "download link" that includes the URL/token. Such a download link may, for example, be sent the logged-in client 202 in the form of a "DOWNLOAD" button or other user-interface element the user can select to effect the transfer of the file 228 from the storage system 238 to the client 202. Alternatively, the download link may be sent to a different client 202 operated by an individual with which the logged-in user desires to share the file 228. For example, in some embodiments, the access management system 234 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 234 and cut-and-paste or otherwise copy the download link into an email or other message the logged in user can then send to the other client 202 to enable the other client 202 to retrieve the file 228 from the storage system 238.

In some embodiments, a logged-in user may select a folder on the file sharing system to which the user wants to transfer one or more files 228 (shown in FIG. 2C) from the logged-in client 202, or to which the logged-in user wants to allow a different user of a different client 202 to transfer one or more files 228. Additionally or alternatively, the logged-in user may identify one or more different users (e.g., by entering their email addresses) the logged-in user wants to be able to access one or more files 228 currently accessible to the logged-in client 202.

Similar to the file downloading process described above, upon receiving such a selection from a client 202, the access management system 234 may take steps to authorize access to the selected folder by the logged-in client 202 and/or the different client 202. In some embodiments, for example, the access management system 234 may interact with the storage system 238 to obtain a unique "upload token" which may subsequently be used by a client 202 to transfer one or more files 228 from the client 202 to the storage system 238. The access management system 234 may, for example, send the upload token to the logged-in client 202 and/or a client 202 operated by a different user.

One or more files 228 may be transferred from a client 202 to the storage system 238 in response to a request that includes the upload token. In some embodiments, for example, the upload token may be appended to a URL that resolves to an IP address of the webserver(s) of the storage system 238. For example, in some embodiments, in response to a logged-in user selecting a folder to which the user desires to transfer one or more files 228 and/or identifying one or more intended recipients of such files 228, the access management system 234 may return a webpage requesting that the user drag-and-drop or otherwise identify the file(s) 228 the user desires to transfer to the selected folder and/or a designated recipient. The returned webpage may also include an "upload link," e.g., in the form of an "UPLOAD" button or other user-interface element that the user can select to effect the transfer of the file(s) 228 from the client 202 to the storage system 238.

In some embodiments, in response to a logged-in user selecting a folder to which the user wants to enable a different client 202 operated by a different user to transfer one or more files 228, the access management system 234 may generate an upload link that may be sent to the different client 202. For example, in some embodiments, the access management system 234 may send an email or other message to the different client 202 that includes a message indicating that the different user has been authorized to transfer one or more files 228 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 228 the different user wishes to upload to the file sharing system 230. The returned webpage may also include a user-interface element, e.g., in the form of an "UPLOAD" button, that the different user can select to effect the transfer of the file(s) 228 from the client 202 to the storage system 238. In other embodiments, the logged-in user may receive the upload link from the access management system 234 and may cut-and-paste or otherwise copy the upload link into an email or other message the logged-in user can then send to the different client 202 to enable the different client to upload one or more files 228 to the storage system 238.

In some embodiments, in response to one or more files 228 being uploaded to a folder, the storage system 238 may send a message to the access management system 234 indicating that the file(s) 228 have been successfully uploaded, and an access management system 234 may, in turn, send an email or other message to one or more users indicating the same. For user's that have accounts with the file sharing system 230, for example, a message may be sent to the account holder that includes a download link that the account holder can select to effect the transfer of the file 228 from the storage system 238 to the client 202 operated by the account holder. Alternatively, the message to the account holder may include a link to a webpage from the access management system 234 inviting the account holder to log in to retrieve the transferred files 228. Likewise, in circumstances in which a logged-in user identifies one or more intended recipients for one or more to-be-uploaded files 228 (e.g., by entering their email addresses), the access management system 234 may send a message including a download link to the designated recipients (e.g., in the manner described above), which such designated recipients can then use to effect the transfer of the file(s) 228 from the storage system 238 to the client(s) 202 operated by those designated recipients.

Figure 3B:
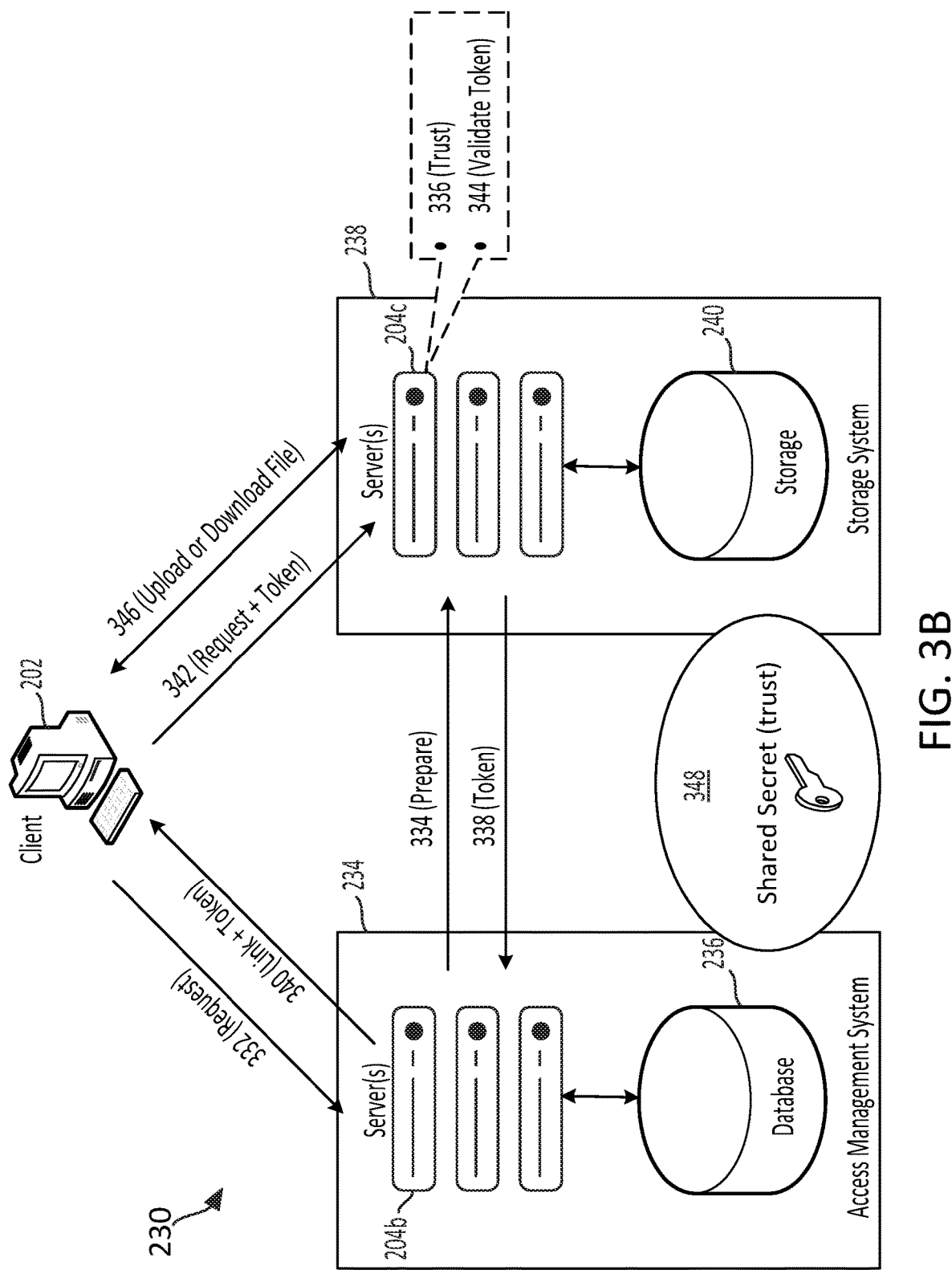
FIG. 3B is a diagram illustrating additional operations that may be performed by the file sharing system shown in FIG. 2C in accordance with some embodiments.

FIG. 3B is a block diagram showing an example of a process for generating access tokens (e.g., the upload tokens and download tokens discussed above) within the file sharing system 230 described in connection with FIGS. 2C and 3A.

As shown, in some embodiments, a logged-in client 202 may initiate the access token generation process by sending an access request 332 to the access management server(s) 204b. As noted above, the access request 332 may, for example, correspond to one or more of (A) a request to enable the downloading of one or more files 228 (shown in FIG. 2C) from the storage system 238 to the logged-in client 202, (B) a request to enable the downloading of one or more files 228 from the storage system 238 to a different client 202 operated by a different user, (C) a request to enable the uploading of one or more files 228 from a logged-in client 202 to a folder on the storage system 238, (D) a request to enable the uploading of one or more files 228 from a different client 202 operated by a different user to a folder of the storage system 238, (E) a request to enable the transfer of one or more files 228, via the storage system 238, from a logged-in client 202 to a different client 202 operated by a different user, or (F) a request to enable the transfer of one or more files 228, via the storage system 238, from a different client 202 operated by a different user to a logged-in client 202.

In response to receiving the access request 332, an access management server 204b may send a "prepare" message 334 to the storage control server(s) 204c of the storage system 238, identifying the type of action indicated in the request, as well as the identity and/or location within the storage medium 240 of any applicable folders and/or files 228. As shown, in some embodiments, a trust relationship may be established (step 336) between the storage control server(s) 204c and the access management server(s) 204b. In some embodiments, for example, the storage control server(s) 204c may establish the trust relationship by validating a hash-based message authentication code (HMAC) based on shared secret or key 348).

After the trust relationship has been established, the storage control server(s) 204c may generate and send (step 338) to the access management server(s) 204b a unique upload token and/or a unique download token, such as those as discussed above.

After the access management server(s) 204b receive a token from the storage control server(s) 204c, the access management server(s) 204b may prepare and send a link 340 including the token to one or more client(s) 202. In some embodiments, for example, the link may contain a fully qualified domain name (FQDN) of the storage control server(s) 204c, together with the token. As discussed above, the link 340 may be sent to the logged-in client 202 and/or to a different client 202 operated by a different user, depending on the operation that was indicated by the request.

The client(s) 202 that receive the token may thereafter send a request 342 (which includes the token) to the storage control server(s) 204c. In response to receiving the request, the storage control server(s) 204c may validate (step 344) the token and, if the validation is successful, the storage control server(s) 204c may interact with the client(s) 202 to effect the transfer (step 346) of the pertinent file(s) 228, as discussed above.

D. Detailed Description of Example Embodiments of a Media File Comparison System (MFCS)

The MFCS 102, as introduced above in connection with FIG. 1, may be implemented using any computing device or system that can access the first media file 104 and the second media file 108. In some implementations, the MFCS 102 may be implemented on a computing device that also stores the first and second media files 104, 108. In other implementations, one or both of the media files 104, 108 may be sent to or retrieved by the MFCS 102 (e.g., from a client 202 or a server 204, such as described above in connection with FIGS. 2 and 3) so that the MFCS 102 may compare them and generate a diff media file 112, as described herein. In some embodiments, the MFCS 102 may be implemented as a client 202 that either stores or is provided access to the media files 104, 108. In other embodiments, the MFCS 102 may be implemented as one or more servers 204 that either store or are provided access to the media files 104, 108. In some implementations, for example, the MFCS 102 may be deployed as a service provided by one or more servers 204 to a client 202. In other implementations, the MFCS 102 may be embodied as an application that is delivered to a client 202a by a server 204a, as described above in connection with FIG. 2B, or by one or more servers 202 that work in conjunction with a server 204a, e.g., by providing the functionality of the FMCS 102 as a service to the server 204a. In still other embodiments, the MFCS 102 may be implemented by one or more access management servers 204b and/or storage control servers 204c, as described above in connection with FIGS. 2C and 3B, or by one or more servers 204 that work in conjunction with the server(s) 204b and/or 204c, e.g., by providing the functionality of the MFCS 102 as a service to the server(s) 204b and/or 204c.

Figure 4:
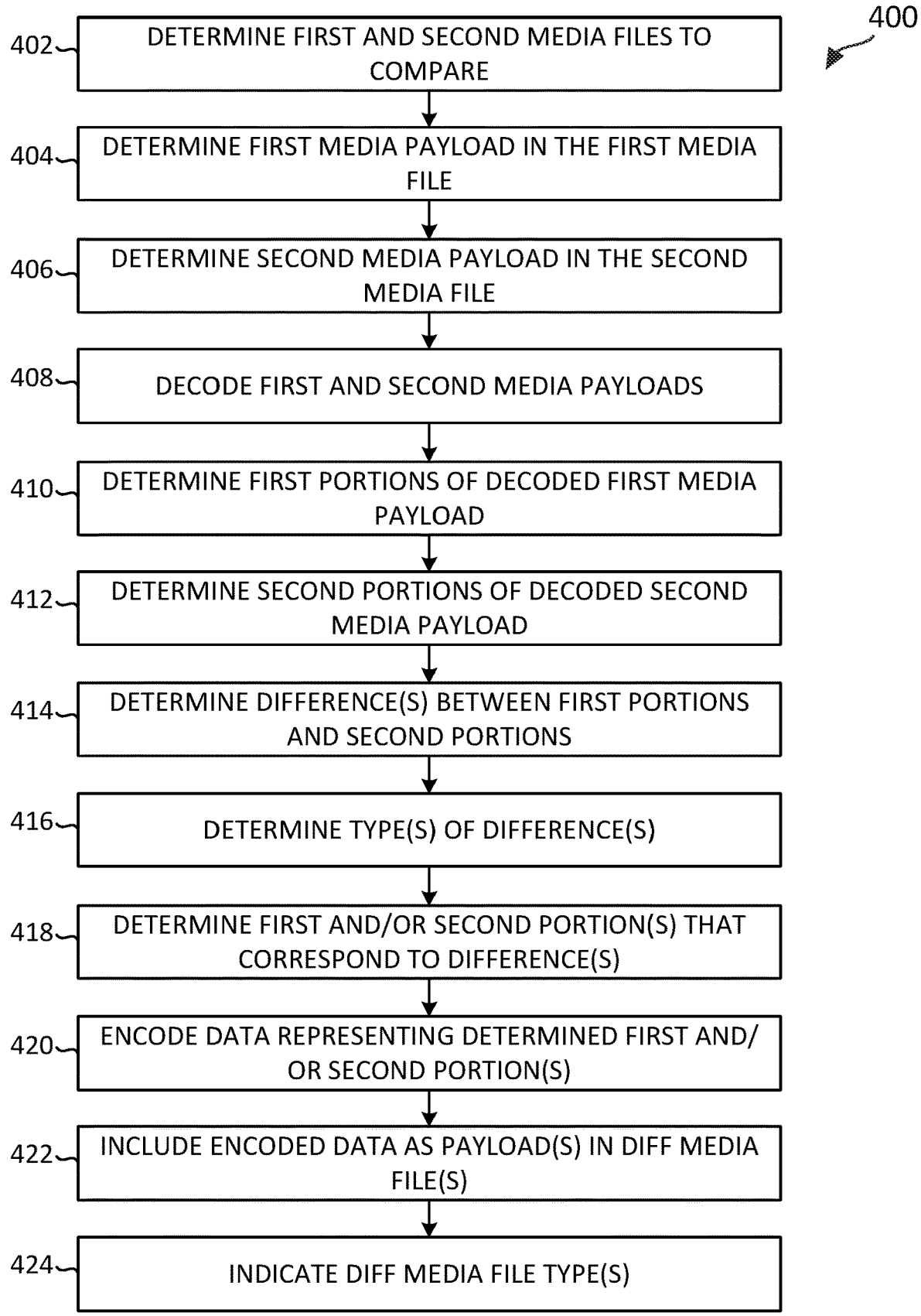
FIG. 4 shows an example routine that may be executed by the MFCS shown in FIG. 1.
Figure 5:
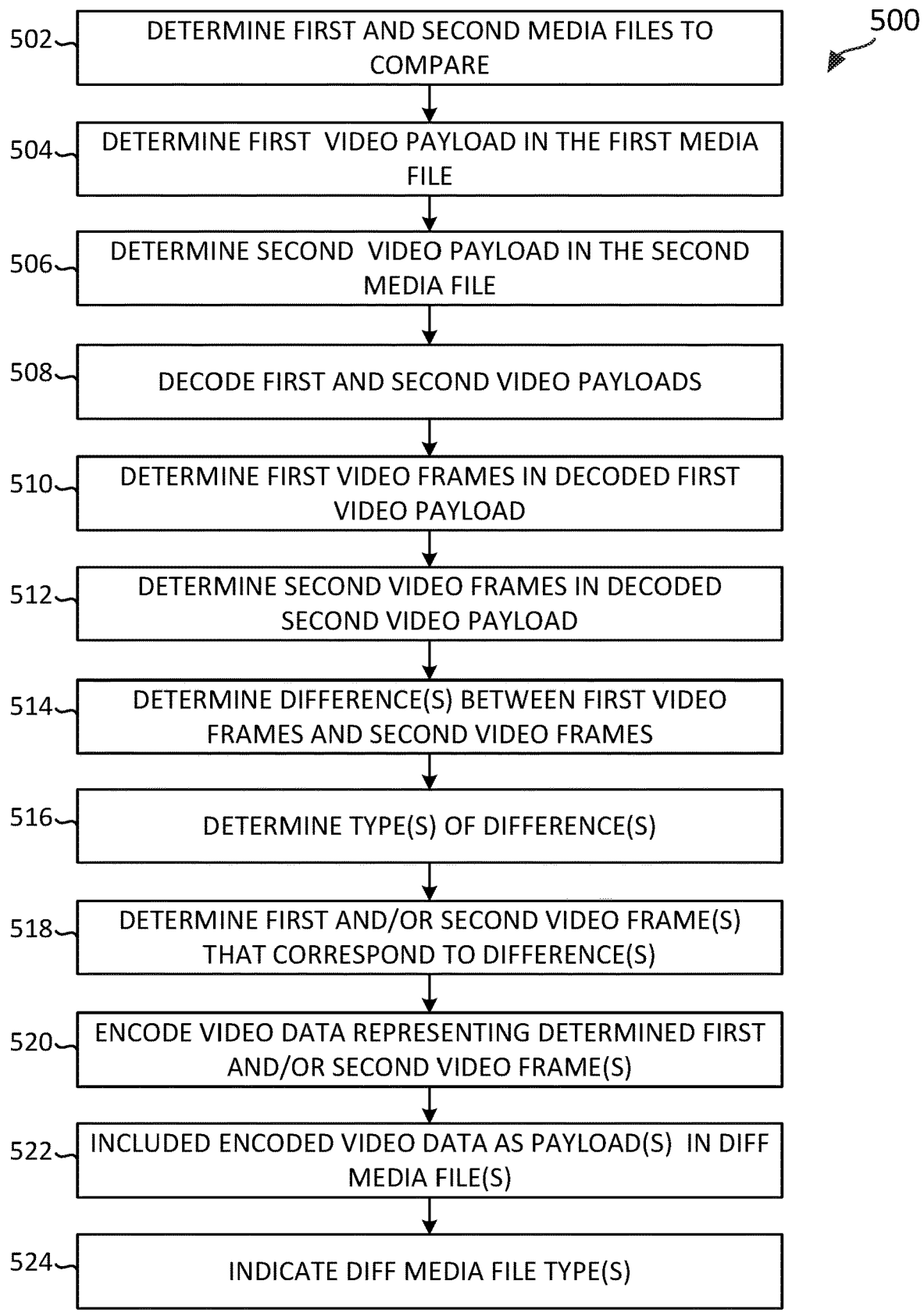
FIG. 5 shows another example routine that may be executed by the MFCS shown in FIG. 1 and which includes particular steps that may be used to compare video payloads of media files.
Figure 6:
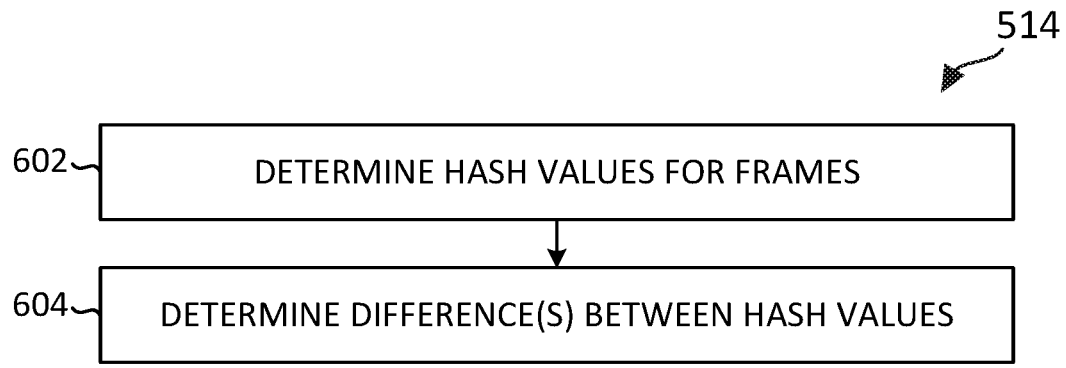
FIG. 6 shows an example implementation of a step shown in FIG. 5 for determining differences between video frames.
Figure 8:
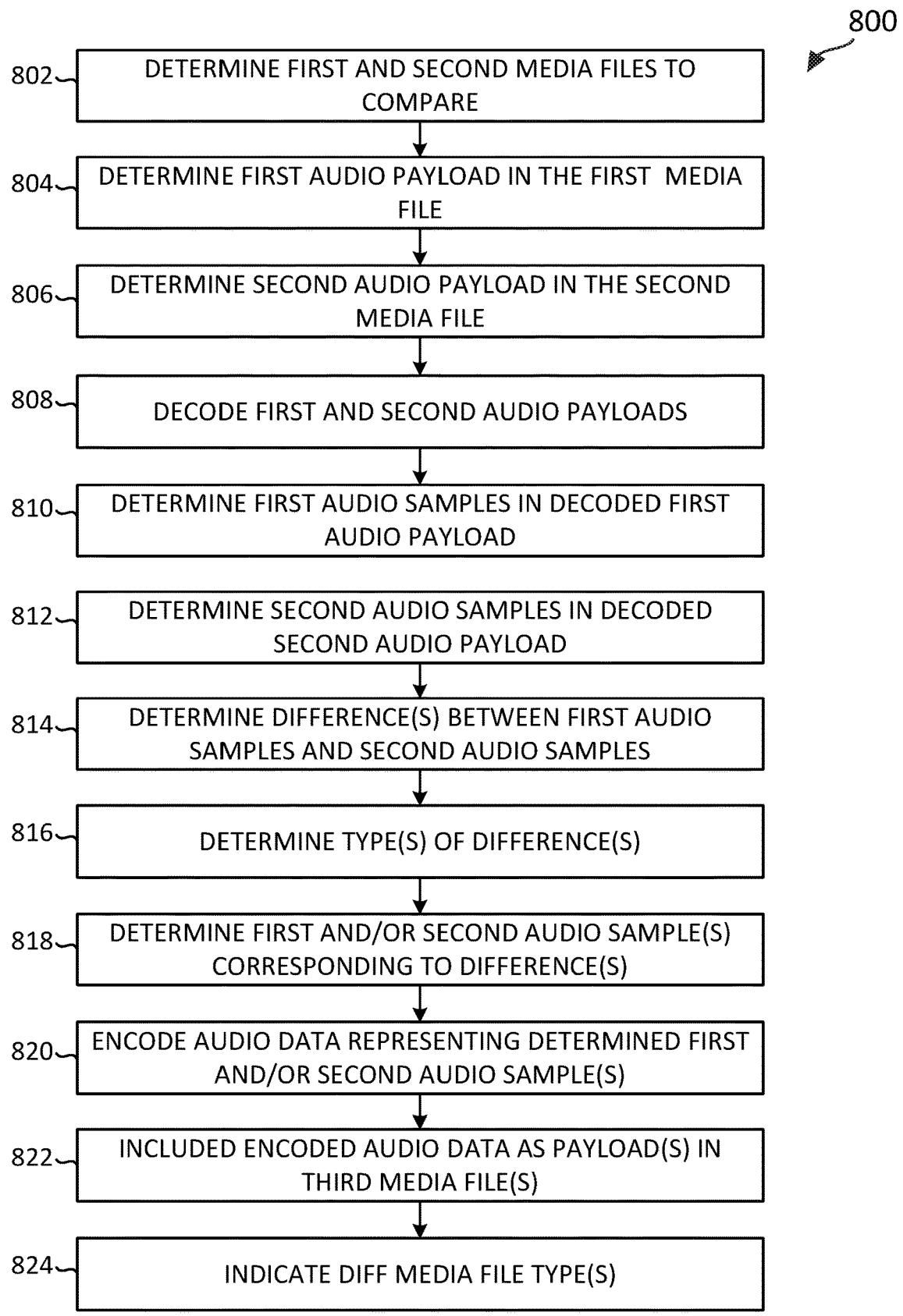
FIG. 8 shows another example routine that may be executed by the MFCS shown in FIG. 1 and which includes particular steps that may be used to compare audio payloads of media files.
Figure 11:
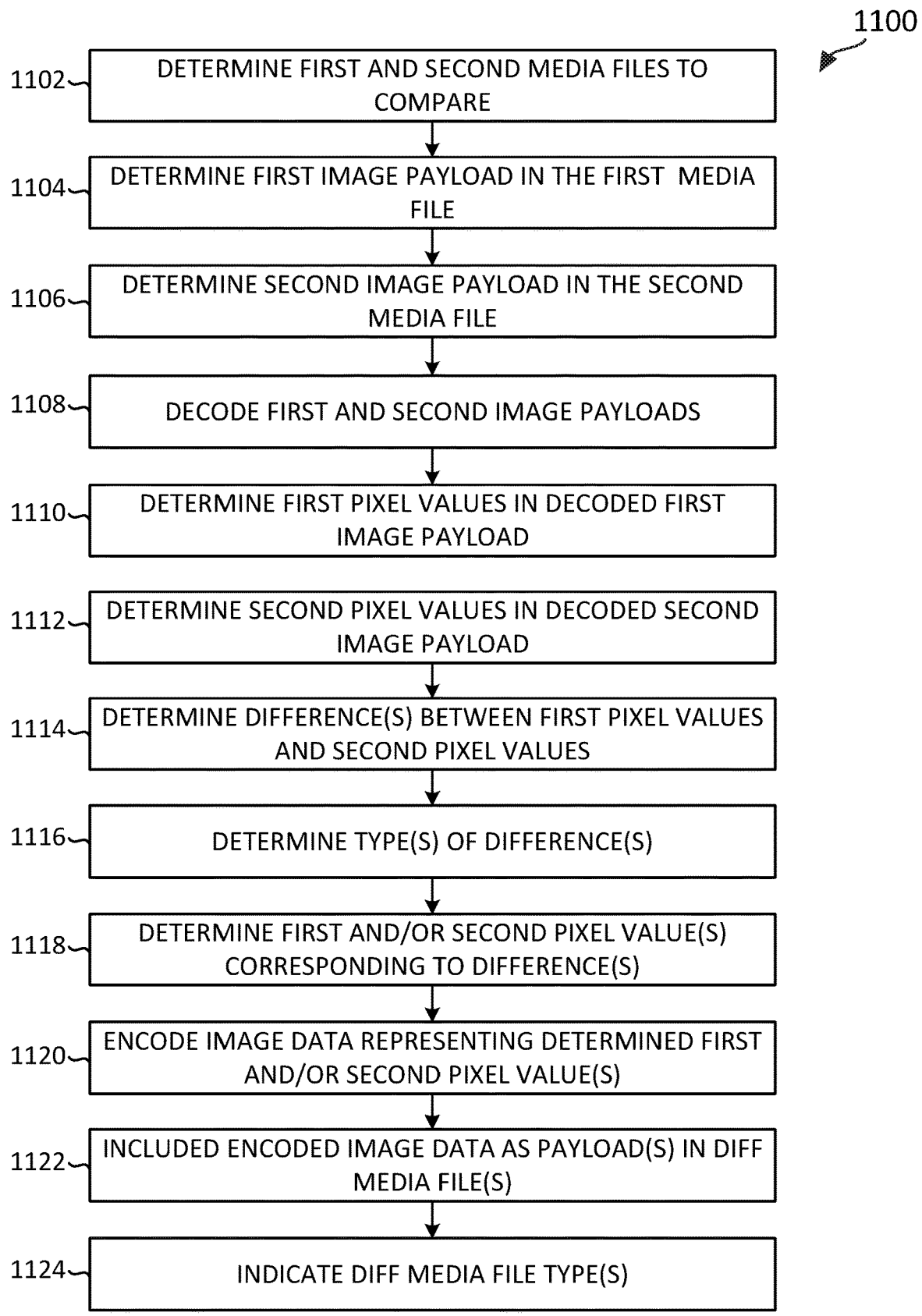
FIG. 11 shows another example routine that may be executed by the MFCS shown in FIG. 1 and which includes particular steps that may be used to compare still image payloads of media files.

FIG. 4 shows an example routine 400 that may be executed by the MFCS 102. The routine 400 may be applied to any of a number of possible media payload types. FIG. 5 shows another example routine 500 that may be executed by the MFCS 102. The routine 500 is similar to the routine 400 but includes particular steps that may be used to compare video payloads of media files. FIG. 8 shows yet another example routine 800 that may be executed by the MFCS 102. The routine 800 is also similar to the routine 400 but includes particular steps that may be used to compare audio payloads of media files. FIG. 11 shows still another example routine 1100 that may be executed by the MFCS 102. The routine 1100 is also similar to the routine 400 but includes particular steps that may be used to compare still image payloads of media files. In some embodiments, the MFCS 102 may include one or more computer-readable media (as described above in connection with FIGS. 2 and 3, or otherwise) that, when executed by one or more processors (as described above in connection with FIGS. 2 and 3, or otherwise), cause the one or more processors and/or other system components to perform the actions of one or more of the routines 400, 500, 800, and 1100.

As shown in FIG. 4, the routine 400 may begin at a step 402, when a first media file 104 and a second media file 108 to be compared by the MFCS 102 (shown in FIG. 1) are determined. Similar to the step 120 described above in connection with FIG. 1, the determination of step 402 may be made in any of numerous ways and in any of a number of circumstances. In some embodiments, for example, a user of a client 202 of a file sharing system 230 (e.g., as shown in FIGS. 2C, 3A, and 3B) may have caused the client 202 to check out the first media file 104 from the file sharing system 230 and then used the client 202 to make one or more changes to the first media payload 106 (e.g., audio, video, or other media payload) of the first media file 104. In such a circumstance, the second media file 108 shown in FIG. 1 (and referenced at step 402) may correspond to the modified version of the first media file 104. The user may then use the client 202 to check the second media file 108 into the file sharing system 230 and the determination at the step 402 may be made in response to the file sharing system 230 receiving such a file check in request.

In other embodiments, a client 202 may have access to a list of media files stored by a file sharing system 230 (e.g., as shown in FIGS. 2C, 3A, and 3B), or one or more other repositories accessible by the MFCS 102, and may simply select first and second stored media files that are to be compared. In such a circumstance, the first media file 104 and the second media file 108 shown in FIG. 1 (and referenced at step 402) may correspond to the two files that are so selected.

In yet other embodiments, a computing device may have both of the first media file 104 and the second media file 108 stored on it and may cause both files to be sent to the MFCS 102 for comparison. In such a circumstance, the first media file 104 and the second media file 108 shown in FIG. 1 (and referenced at step 402) may correspond to the two files that are sent to the MFCS 102 along with an instruction to compare them.

In still other embodiments, the MFCS 102 may itself be a computing device operated by a user and the first and second media files referenced at step 402 may be stored on the computing device, or in one or more repositories accessible to the computing device, and the determination of step 402 may be performed by the computing device based on input from the user indicating that the two files are to be compared.

As shown in FIG. 4, at a step 404, the MFCS 102 may examine the first media file 104 to determine first data in the first media file 104 that corresponds to a first encoded media payload of a particular media type, e.g., a video payload, a payload for an audio channel, or a payload for a still image. Similarly, at a step 406, the MFCS 102 may examine the second media file 108 to determine second data in the second media file 108 that corresponds to a second encoded media payload of the same type as the first encoded media payload.

At a step 408, the determined first and second data may then be decoded (e.g., decompressed) to yield uncompressed binary data corresponding to the media represented by the respective payloads, e.g., sequences of video frames, sequences of audio samples, or image bit maps.

At a step 410, the decoded first media payload may be evaluated to determine portions of the decoded first media payload that are to be compared with corresponding portions of the decoded second media payload. Examples of such portions, e.g., video frames, audio samples or sample groups, pixel values or pixel value groups, are described below in connection with FIGS. 5, 8, and 11. Similarly, at a step 412, the decoded second media payload may be evaluated to determine portions of the decoded second media payload that are to be compared with corresponding portions of the decoded first media payload.

At a step 414, the portions of the first and second decoded media payloads determined at the steps 410 and 412 may be compared to identify differences between them. In some embodiments, the format of one of both of the decoded media payloads may be adjusted to allow an accurate comparison to take place. For example, in some embodiments, the format of one of the decoded media payloads may be converted into the same format as the other media payload, or the formats of the respective decoded media payloads may each be converted to a common format for purposes of comparison. In some embodiments, for example, such a conversion may be performed to ensure that two to-be-compared binary files have the same number of bits and can thus be readily subjected to a binary comparison.

The comparison of media payloads may be performed in any of a number of ways and may yield a number of different results, depending on the type and format of the media at issue as well as the desired goal of the comparison. Examples of a number of comparison techniques that may be employed for a variety of media types, e.g., video, audio, and still images, are described below in connection with FIGS. 6-11. In some embodiments, time stamps, sequence numbers, or the like, associated with respective portions, e.g., video frames, audio samples or sample groups, etc., may be used to facilitate the comparison performed at the step 414.

At a step 416, the type or nature of the identified differences between the compared portions may be determined. For example, as explained in more detail below in connection with FIGS. 7A-D and 10A-D, in some embodiments, the MFCS 102 may determine whether the second media payload 108: (A) represents one or more media segments (e.g., video frames, audio samples, pixel values) that were not represented in the first media payload 106, (B) lacks a representation of one or more media segments that were represented in first media payload 106, (C) represents one or more media segments that replaced one or more media segments represented in the first media payload 106, and/or (D) represents one or more media segments that are a modified version of one or more media segments represented in the first media payload 106.

At a step 418, the portions of the first and second decoded media payloads determined at the steps 410 and 412 that correspond to the differences determined at the steps 414 and 416 may be identified. In some embodiments, the identified portions corresponding to each particular type of determined difference, e.g., added portions, deleted portions, replaced/ replacement portions, and/or modified portions, may be determined.

At a step 420, the data corresponding to the portions determined at the step 418 may be encoded (e.g., compressed) for inclusion in one or more diff media files. In some embodiments, the data corresponding to each determined type of difference (determined at the step 416) may be encoded separately from the data for the other types of determined differences. In other embodiments, the data corresponding to multiple determined difference types may be segregated into difference types (e.g., video frame segments, or audio sample segments) and then encoded as a unit, preferably also embedding some indication of the difference type together with the media (see step 424, described below). It should be appreciated that, in some embodiments, at least for certain media file types, differences between the media represented by the first and second media files, as well as the types of such differences, may be ascertained by simply comparing the media payloads of the first and second media files (or portions thereof) without first decoding the payloads. In such implementations, the portions of the routine 400 pertaining to decoding and encoding of media payload data may be omitted.

At a step 422, the encoded data representing the determined differences may be included as one or more payloads in one or more diff media files. In some embodiments, media corresponding to each difference type may be included in a separate diff media file. For example, in some embodiments, separate diff media files may be generated representing each of added media segments, deleted media segments, replaced/ replacement media segments, or modified media segments. Each such separate diff media file may include an indication (see the step 424), e.g., in a file name, in embedded media, or otherwise, of the type of difference the file represents. In other embodiments, a single diff media file may be generated that includes data representing each type of difference, together with indications of the types of differences that are represented. In some embodiments, for example, the generated diff media file may include a separate chapter or the like corresponding to each type of determined difference.

FIG. 5 shows an example routine 500 corresponding to a specific implementation of the routine 400 that may be employed to compare first and second media files that each include video payloads. Because the routine 500 is similar to the routine 400 in many respects, the following discussion will focus primarily on the portions relating specifically to video payload processing.

As shown in FIG. 5, after determining the first media file 104 and the second media file 108 that are to be compared (step 502), the MFCS 102 may (at steps 504 and 506) determine first and second video payloads in the first and second media files, respectively. The determined first and second video payloads may each be decoded (step 508), and respective video frames in the decoded video payloads may be determined (steps 510 and 512). At a step 514, differences between the determined video frames for the two video payloads may be determined. The comparison between video frames for the two payloads may be accomplished in any of numerous ways. In some embodiments, the step 514 may involve comparing bitmaps for respective pairs of video frames directly. In other embodiments, as illustrated in FIG.

6, the step 514 may involve using frame bitmaps to determine hash values for respective video frames (step 602) and differences between frames may be determined by comparing the generated hash values (step 604). Other video frame comparison techniques are also possible and contemplated. Returning to FIG. 5, as shown at a step 516, the types of differences between the video frames of the first and second payloads may also be determined.

FIGS. 7-D show several examples of types of differences that may be ascertained by comparing frames of the decoded first and second video payloads. In each of FIGS. 7A-7D, the values F0-F9 designate a sequential group of video frames, with frame F1 following frame F0, frame F2 following frame F1, and so on. In some embodiments, for example, each of the frames may be accompanied by a timestamp, sequence identifier, etc., to allow the correct sequential order of the frames to be determined. The values "A," "B," "C," etc., underneath the frame designators, represent bitmaps, or hash values or other indicators corresponding to bitmaps, for the respective frames. The discussion below will refer to respective frames and their contents by specifying the frame sequence number, e.g., "F1," followed by the frame content indicator, e.g., "A", in parentheses, e.g., F1(A), F2(B), etc.

Figure 7A:
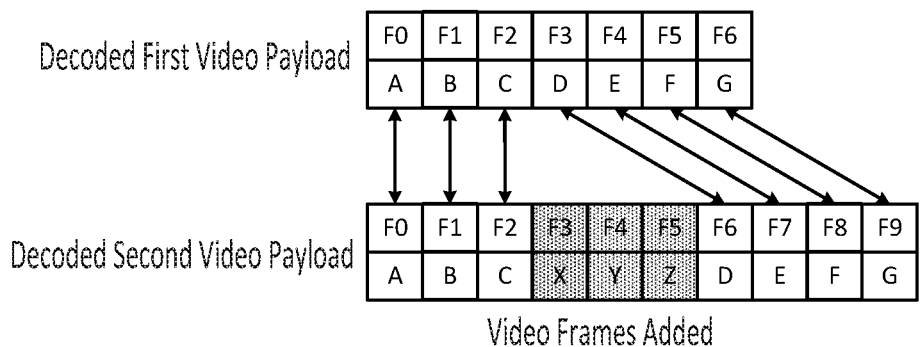
FIG. 7A shows an example of a first type of difference that may be determined between video payloads in accordance with some embodiments.
Figure 7B:
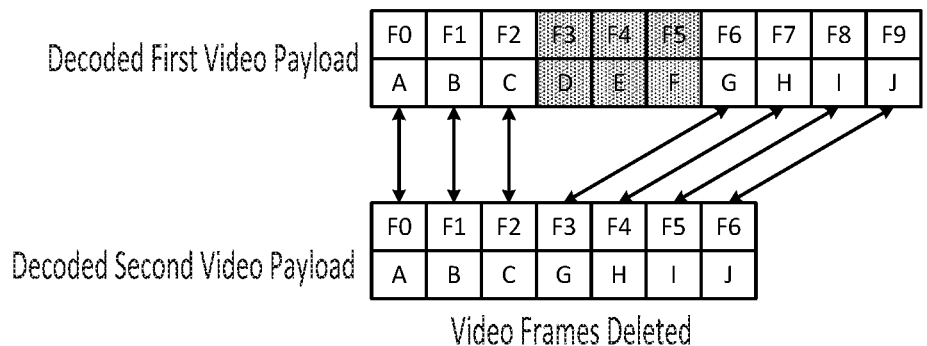
FIG. 7B shows an example of a second type of difference that may be determined between video payloads in accordance with some embodiments.

FIG. 7A illustrates a scenario in which the decoded second video payload includes three frames, i.e., F3(X), F4(Y) and F5 (Z), that are not included in the decoded first video payload. Similarly, FIG. 7B illustrates a scenario in which the decoded first video payload includes three frames, i.e., F3(D), F4(E) and F5(F), that are not included in the decoded second video payload. Based on a comparison of the represented video frames, by comparing hash values or otherwise, and depending on which of the two data sets is designated as the "original" for comparison purposes, the MFCS 102 may determine either that three new frames, i.e., F3(X), F4(Y) and F5(Z), were inserted between frames F2(C) and F3(D) of the decoded first video payload to form the decoded second video payload, as in FIG. 7A, or that three frames, i.e., F3(D), F4(E), and F5(F) were deleted from the decoded first video payload to form the decoded second video payload, as in FIG. 7B.

In the example of FIG. 7A, the decoded first video payload is treated as the original payload for comparison purposes and the decoded second video payload includes a sequence of video frames that are not included in the decoded first video payload. In this circumstance, the MFCS 102 may determine that the decoded first video payload has been altered by inserting three new frames, i.e., F3(X), F4(Y) and F5(Z). For example, after determining that the first three frames of the two payloads, i.e., F0(A), F2(B), and F3(C) match, the MFCS 102 may determine that the fourth frame of the first video payload, i.e., F3(D) does not match the fourth frame of the second video payload, i.e., F3(X). The MFCS 102 may then look ahead in the other frames of the second video payload to try to find a frame with content that matches the mismatched frame F3(D). In the example shown, the MFCS 102 was able to find a frame in the second video payload, i.e., F6(D), that includes the content "D" of the mismatched frame F3(D) of the first video payload. Based on this determination, the MFCS 102 may determine that three new frames, i.e., F3(X), F4(Y) and F5(Z), were inserted between frames F2(C) and F3(D) of the decoded first video payload to form the decoded second video payload.

In the example of FIG. 7B, on the other hand, the decoded first video payload is also treated as the original payload for comparison purposes but the decoded first video payload includes a sequence of video frames that are not included in the decoded second video payload, rather than the other way around. In this circumstance, the MFCS 102 may determine that the decoded first video payload has been altered by deleting three frames, i.e., F3(D), F4(E) and F5(F). For example, after determining that the first three frames of the two payloads, i.e., F0(A), F2(B), and F3(C) match, the MFCS 102 may determine that the fourth frame of the second video payload, i.e., F3(G) does not match the fourth frame of the first video payload, i.e., F3(D). The MFCS 102 may then look ahead in the other frames of the first video payload to try to find a frame with content that matches the mismatched frame F3(G). In the example shown, the MFCS 102 was able to find a frame in the first video payload, i.e., F6(G), that includes the content "G" of the mismatched frame F3(G) of the second video payload. Based on this determination, the MFCS 102 may determine that three frames, i.e., F3(D), F4(E) and F5(F), were deleted from the decoded first video payload to form the decoded second video payload.

Figure 7C:
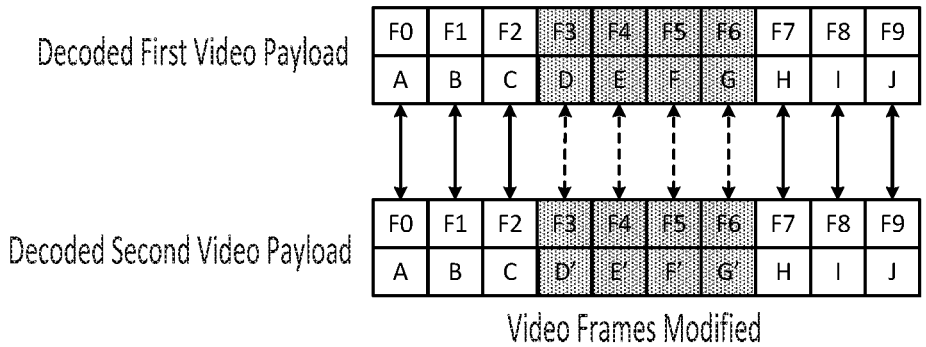
FIG. 7C shows an example of a third type of difference that may be determined between video payloads in accordance with some embodiments.
Figure 7D:
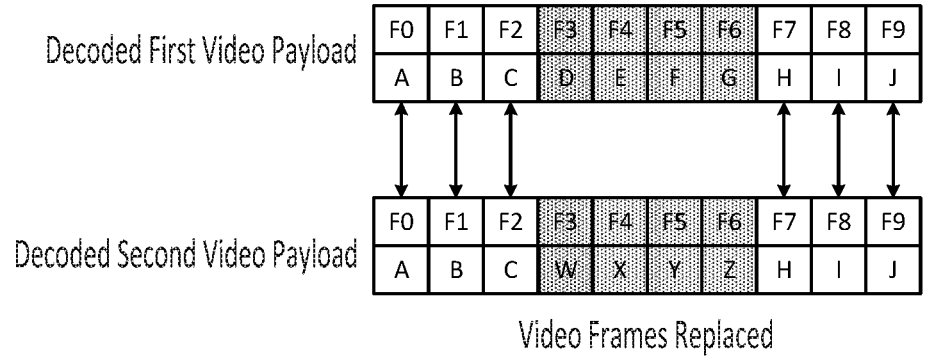
FIG. 7D shows an example of a fourth type of difference that may be determined between video payloads in accordance with some embodiments.

In the examples of each of FIGS. 7C and 7D, a sequence of mismatching video frames, i.e., between frames F2(C) and F7(H), are identified. In some embodiments, these two circumstances may be determined to correspond to different difference types depending on the degree of similarity between the groups of frames determined to include differences. In other embodiments, each of these two scenarios may be treated as a "replacement" difference, i.e., where one set of frames in an original video sequence has been replaced by another, like that shown in FIG. 7D. For the FIG. 7C scenario, once mismatched frames have been identified, e.g., by comparing hash values or otherwise, the bitmaps for the corresponding mismatched frames may be compared to determine a degree of similarity between the bitmaps. If the similarity between the bitmaps is greater than a threshold, e.g., if more that 75% or some other threshold quantity, of the pixel values for the compared frames match, then one of the frames may be determined to be a "modified" version of the other. Such a scenario could arise, for example, where a certain element in a video scene is edited out of multiple sequential frames while the remainder of the scene remains unchanged.

Referring again to FIG. 5, after determining the existence (step 514) and type (step 516) of differences between video frames for the first and second video payloads, the MFCS 102 may determine (at step 518) the video frames that correspond to such differences. At a step 520, the data corresponding to the video frames determined at the step 518 may be encoded (e.g., compressed) for inclusion in one or more diff media files (step 522). As discussed above in connection with FIG. 4, the diff media file(s) so generated may be labeled or otherwise formatted so as to make the nature of the difference represented by the diff media file(s) readily apparent to a user who views the file(s). For example, in some embodiments, the MFCS 102 may generate four separate diff media files resulting from a comparison of an "original" file to a "modified" file, with one file including only "added scenes," another file including only "deleted scenes," yet another file including only "modified scenes," and still another file including only "replaced/replacement" scenes. In other embodiments, additional, fewer, or different types of differences, or various combinations of such difference types, may be included or combined in one or more media files.

Further, in circumstances like that shown in FIG. 7C, where a modified video scene has been determined to exist, in addition to or in lieu of determining data representing the entirety of the altered scene, further processing may be done, similar to that discussed below in connection with FIG. 11, to identify differences between respective frames on a pixel-by-pixel level, or pixel group-by-pixel group level, and the respective frames that are encoded for inclusion in the diff video file may include "active" data for only those regions of the frames in which individual pixels, or pixel groups, have been modified, with the remainder of the pixels, or pixel groups, being made "passive," e.g., all white or all black. In such an embodiment, not only would a user be able to readily comprehend which scenes of a video have been altered in some fashion but also the precise changes that were made to the scenes in question.

FIG. 8 shows an example routine 800 corresponding to a specific implementation of the routine 400 that may be employed to compare first and second media files that each include audio payloads. Because the routine 800 is similar to the routine 400 in many respects, the following discussion will focus primarily on the portions relating specifically to audio payload processing.

Figure 9:
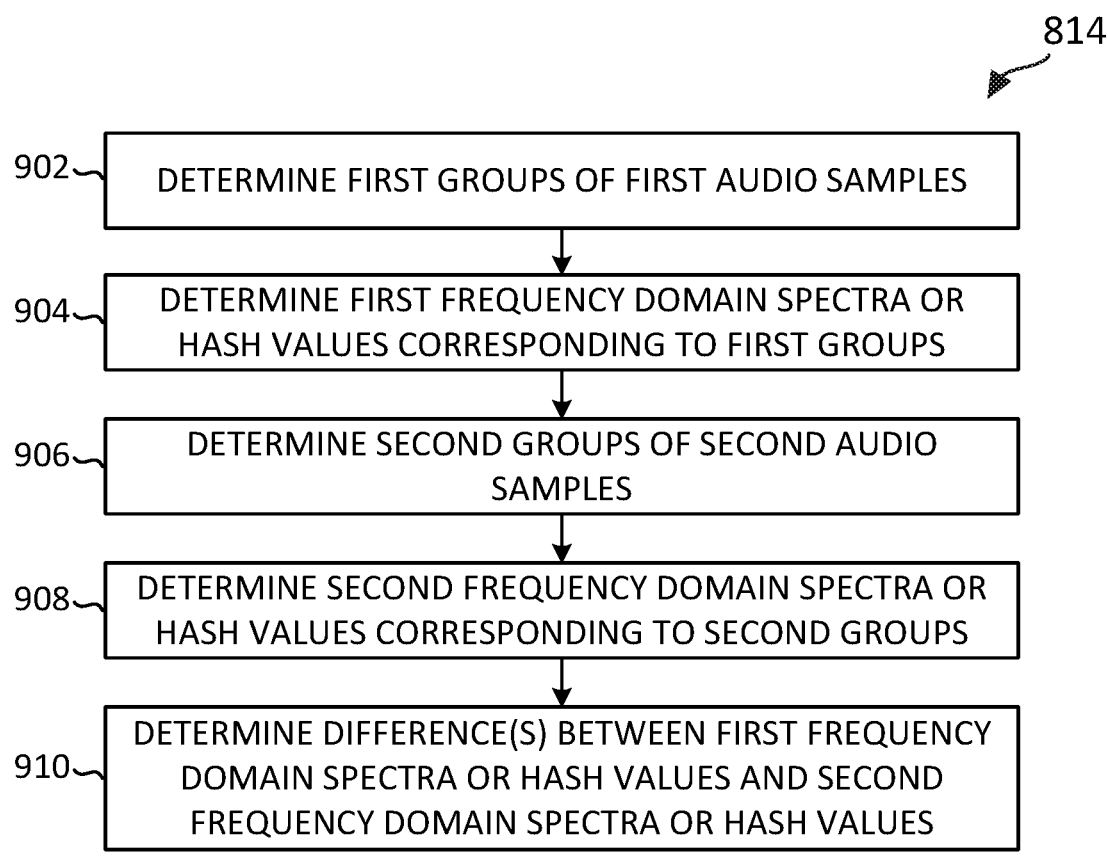
FIG. 9 shows an example implementation of a step shown in FIG. 8 for determining differences between groups of audio samples.

As shown in FIG. 8, after determining the first media file 104 and the second media file 108 that are to be compared (step 802), the MFCS 102 may (at steps 804 and 806) determine first and second audio payloads in the first and second media files, respectively. The first and second audio payloads may, for example, correspond to the same audio channel of two media files of the same type, e.g., two MP4 files. The determined first and second audio payloads may each be decoded (step 808), and respective audio samples in the decoded audio payloads may be determined (steps 810 and 812). At a step 814, differences between the determined audio samples for the two audio payloads may be determined. The comparison between audio samples for the two audio payloads may be accomplished in any of numerous ways. In some embodiments, the step 814 may involve comparing respective pairs of audio samples directly. In other embodiments, as illustrated in FIG. 9, the step 814 may involve comparing respective groups of audio samples, or audio frames, that each includes a particular number of audio samples. Although the following discussion refers to "groups" of audio samples, it should be appreciated that each such group may, in some embodiment, include only a single audio sample.

As shown in FIG. 9, at a step 902, first groups of audio samples from the first audio payload may be determined and, as a step 904, a frequency domain spectra or hash value may be determined for each such first group of audio samples. In some embodiments, for example, a digital signal processor (DSP) may be used to perform a Fast-Fourier-Transform (FFT) on each of the first audio sample groups to yield frequency domain spectra for the respective groups. Similarly, at a step 906, second groups of audio samples from the second audio payload may be determined and, as a step 908, a frequency domain spectra or hash value may be determined for each such second group of audio samples. Finally, at a step 910, differences between the determined audio sample groups may be determined by comparing the generated frequency domain spectra or hash values. Other techniques for comparing audio samples, or groups of audio samples, are also possible and contemplated. Returning to FIG. 8, as shown at a step 816, the types of differences between the audio streams of the first and second payloads may also be determined.

FIGS. 10A-D show several examples of types of differences that may be ascertained by comparing audio sample groups of the decoded first and second audio payloads. In each of FIGS. 10A-D, G0-G9 designate a sequential group of audio samples, with group G1 following group G0, group G2 following group G1, and so on. In some embodiments, for example, each of the sample groups may be accompanied by a timestamp, sequence identifier, etc., to allow the correct sequential order of the sample groups to be determined. The values "A," "B," "C," etc., underneath the group designators, represent sample values, frequency spectra, hash values, or other indicators corresponding to sample values, for the respective sample groups. The discussion below will refer to respective groups and their contents by specifying the group sequence number, e.g., "G1," followed by the audio content indicator, e.g., "A", in parentheses, e.g., G1(A), G2(B), etc.

Figure 10A:
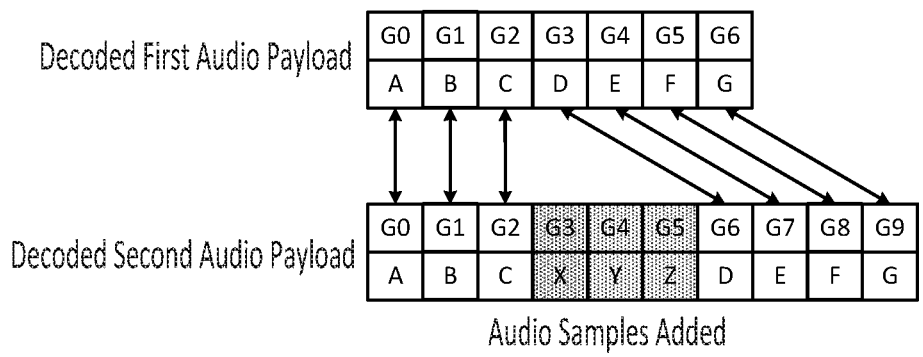
FIG. 10A shows an example of a first type of difference that may be determined between audio payloads in accordance with some embodiments.
Figure 10B:
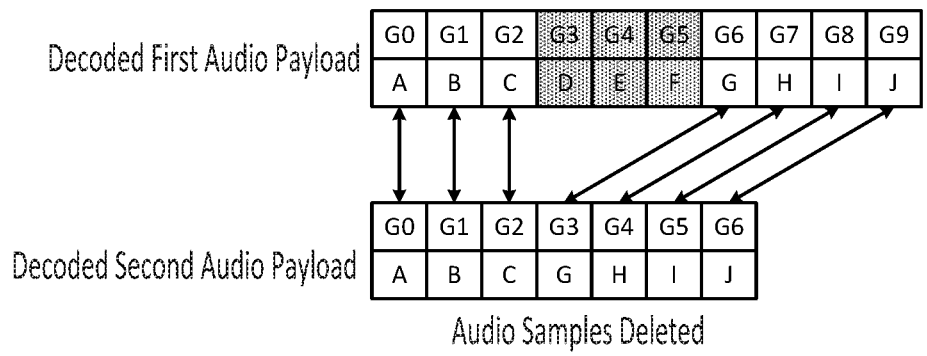
FIG. 10B shows an example of a second type of difference that may be determined between audio payloads in accordance with some embodiments.

FIG. 10A illustrates a scenario in which the decoded second audio payload includes three audio sample groups, i.e., G3(X), G4(Y) and G5(Z), that are not included in the decoded first audio payload. Similarly, FIG. 10B illustrates a scenario in which the decoded first audio payload includes three audio sample groups, i.e., G3(D), G4(E) and G5(F), that are not included in the decoded second audio payload. Based on a comparison of the represented sample groups, by comparing frequency spectra, hash values or otherwise, and depending on which of the two data sets is designated as the "original" for comparison purposes, the MFCS 102 may determine either that three new audio sample groups, i.e., G3(X), G4(Y) and G5(Z), were inserted between groups G2(C) and G3(D) of the decoded first audio payload to form the decoded second audio payload, as in FIG. 10A, or that three audio sample groups, i.e., G3(D), G4(E), and G5(F) were deleted from the decoded first audio payload to form the decoded second audio payload, as in FIG. 10B.

In the example of FIG. 10A, the decoded first audio payload is treated as the original payload for comparison purposes and the decoded second audio payload includes a sequence of audio sample groups that are not included in the decoded first audio payload. In this circumstance, the MFCS 102 may determine that the decoded first audio payload has been altered by inserting three audio sample groups, i.e., G3(X), G4(Y) and G5(Z). For example, after determining that the first three audio sample groups of the two payloads, i.e., G0(A), G2(B), and G3(C) match, the MFCS 102 may determine that the fourth audio sample group of the first audio payload, i.e., G3(D) does not match the fourth audio sample group of the second audio payload, i.e., G3(X). The MFCS 102 may then look ahead in the other audio sample groups of the second audio payload to try to find an audio sample group with content that matches the mismatched audio sample group G3(D). In the example shown, the MFCS 102 was able to find an audio sample group in the second audio payload, i.e., G6(D), that includes the content "D" of the mismatched audio sample group G3(D) of the first audio payload. Based on this determination, the MFCS 102 may determine that three new audio sample groups, i.e., G3(X), G4(Y) and G5(Z), were inserted between audio sample groups G2(C) and G3(D) of the decoded first audio payload to form the decoded second audio payload.

In the example of FIG. 10B, on the other hand, the decoded first audio payload is also treated as the original payload for comparison purposes but the decoded first audio payload includes a sequence of audio sample groups that are not included in the decoded second audio payload, rather than the other way around. In this circumstance, the MFCS 102 may determine that the decoded first audio payload has been altered by deleting three audio sample groups, i.e., G3(D), G4(E) and G5(F). For example, after determining that the first three audio sample groups of the two payloads, i.e., G0(A), G2(B), and G3(C) match, the MFCS 102 may determine that the fourth audio sample group of the second audio payload, i.e., G3(G) does not match the fourth audio sample group of the first audio payload, i.e., G3(D). The MFCS 102 may then look ahead in the other audio sample groups of the first audio payload to try to find an audio sample group with content that matches the mismatched audio sample group G3(G). In the example shown, the MFCS 102 was able to find an audio sample group in the first audio payload, i.e., G6(G), that includes the content "G" of the mismatched audio sample group G3(G) of the second audio payload. Based on this determination, the MFCS 102 may determine that three audio sample groups, i.e., G3(D), G4(E) and G5(F), were deleted from the decoded first audio payload to form the decoded second audio payload.

Figure 10C:
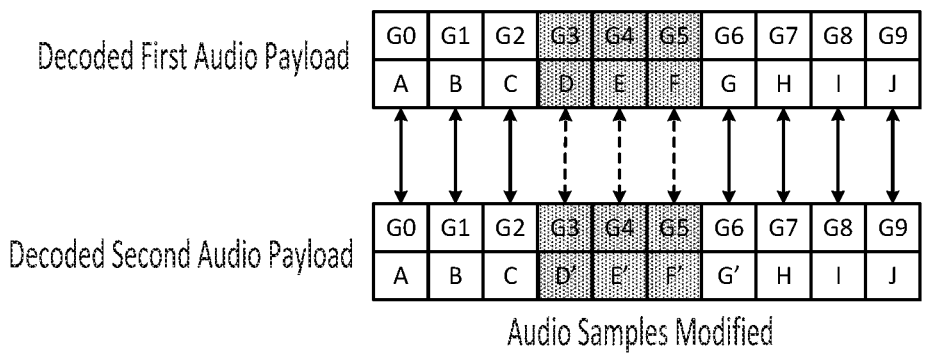
FIG. 10C shows an example of a third type of difference that may be determined between audio payloads in accordance with some embodiments.
Figure 10D:
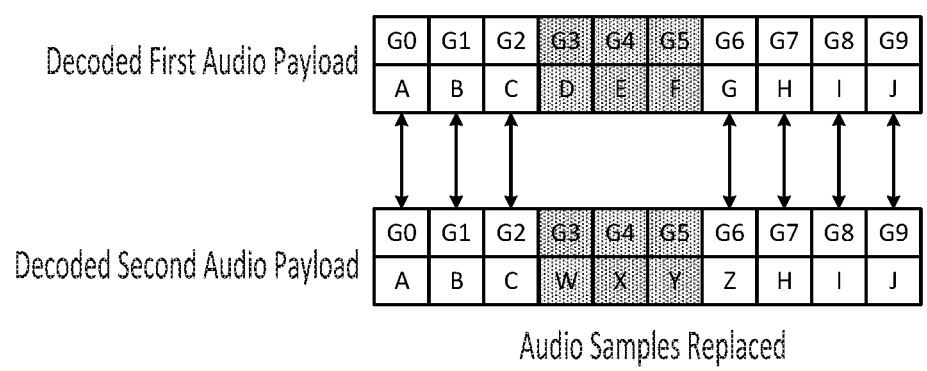
FIG. 10D shows an example of a fourth type of difference that may be determined between audio payloads in accordance with some embodiments.

In the examples of each of FIG. 10C and OD, a sequence of mismatching audio sample groups, i.e., between audio sample groups G2(C) and G7(H), are identified. In some embodiments, these two circumstances may be determined to correspond to different difference types depending on the degree of similarity between the groups determined to include differences. In other embodiments, each of these two scenarios may be treated as a "replacement" difference, i.e., where one sequence of audio sample groups in an original audio stream has been replaced by another, like that shown in FIG. 10D. For the FIG. 10C scenario, once mismatched audio sample groups have been identified, e.g., by comparing frequency spectra, hash values or otherwise, the mismatched audio sample groups may be further compared to determine a degree of similarity between them. If the similarity between the audio sample groups is greater than a threshold, then one of the audio sample groups may be determined to be a "modified" version of the other.

Referring again to FIG. 8, after determining the existence (step 814) and type (step 816) of differences between audio sample groups for the first and second audio payloads, the MFCS 102 may determine (at step 818) the audio sample groups that correspond to such differences. At a step 820, the data corresponding to the audio sample groups determined at the step 818 may be encoded (e.g., compressed) for inclusion in one or more diff media files (step 822). As discussed above in connection with FIG. 4, the diff media file(s) so generated may be labeled or otherwise formatted so as to make the nature of the difference represented by the diff media file(s) readily apparent to a user who accesses the file(s). For example, in some embodiments, the MFCS 102 may generate four separate diff media files resulting from a comparison of an "original" file to a "modified" file, with one file including only "added audio," another file including only "deleted audio," yet another file including only "modified audio," and still another file including only "replaced/replacement" audio. In other embodiments, additional, fewer, or different types of differences, or various combinations of such difference types, may be included or combined in one or more media files.

FIG. 11 shows an example routine 1100 corresponding to a specific implementation of the routine 400 that may be employed to compare first and second media files that each include still image payloads. Because the routine 1100 is similar to the routine 400 in many respects, the following discussion will focus primarily on the portions relating specifically to still image payload processing.

As shown in FIG. 11, after determining the first media file 104 and the second media file 108 that are to be compared (step 1102), the MFCS 102 may (at steps 1104 and 1106) determine first and second still image payloads in the first and second media files, respectively. The determined first and second still image payloads may each be decoded (step 1108), and respective pixel values, or groups of pixel values, in the decoded still image payloads may be determined (steps 1110 and 1112). At a step 1114, differences between the determined pixel values, or groups of pixel values, for the two still image payloads may be determined. The comparison between pixel values or groups of pixel values for the two still image payloads may be accomplished in any of numerous ways. In some embodiments, the step 1114 may involve comparing respective pairs of pixel values from the two still images directly. In other embodiments, groups of adjacent pixels, e.g., pixels in 16-by-16 squares, may be determined in each still image, and a comparison may be made between corresponding pixel groups from the two images. In some embodiments, a hash value may be calculated for each determined pixel group to facilitate its comparison with other pixel groups. At a step 1116, the types of differences between the still images represented by the first and second payloads may also be determined. For example, in some embodiments, the MFCS 102 may determine that a "modified" image includes pixels that were not included in an "original" image, such as additional rows or columns of pixels, or may determine that a "modified" image omits pixels that were included in an original image, such as by deleting one or more rows or columns of pixels. Additionally or alternatively, the MFCS 102 may determine that certain pixels in a "modified" image replaced corresponding pixels in an "original" image, or that certain pixel groups within a "modified" image represent a slightly modified version of an "original" image. In any event, the MFCS 102 may (at a step 1118) determine pixel values to include in a diff image that will allow a user to readily ascertain the differences between the still images represented by the payloads of the two media files. In some embodiments, for example, a diff still image may be created that includes "active" data for only those regions in which individual pixels, or pixel groups, have been added, deleted, modified and/or replaced, with the remainder of the pixels, or pixel groups, being made "passive," e.g., all white or all black. In some embodiments, one or more parameters of the comparison algorithm may be adjusted, e.g., altering the dimensions of the compared pixel groups, or altering a value of a similarity threshold that triggers inclusion of a pixel or pixel group in the generated diff image.

After pixel values corresponding to one or more identified differences between the still images have been determined, the MFCS 102 may encode (step 1120) image data including those "active" pixel values, and possibly also including filler values for "passive" pixels, to be included (step 1122) as one or more payloads in one or more media diff files. The media diff file(s) so generated may further indicate, either in a file name or otherwise, the type of difference the file represents. For example, in some embodiments, one diff media file may indicate that it represent pixels, or groups of pixels, that are included in a first image but omitted in a second image, and another diff media file may indicate that it represents pixels, or groups of pixels, that are included in the second image but omitted in the first image.

E. Example Implementations of Methods, Systems, and Computer-Readable Media in Accordance with the Present Disclosure The following paragraphs (M1) through (M23) describe examples of methods implemented in accordance with the present disclosure.

(M1) A method may involve determining first payload data included in a first file container, wherein the first payload data represents first content, and determining second payload data included in a second file container, wherein the second payload data represents second content. The first payload data may be decoded to determine first un-encoded data representing the first content, and the second payload data may be decoded to determine second un-encoded data representing the second content. At least one difference may be determined between the first un-encoded data and the second un-encoded data, and third un-encoded data corresponding to the at least one difference may be determined. The third un-encoded data may be encoded to generate third payload data representing third content, and a third file container may be generated that includes the third payload data.

(M2) A method may be performed as described in paragraph (M1), wherein the first un-encoded data comprises a first sequence of bits, the second un-encoded data comprises a second sequence of bits, each of the bits in the second sequence corresponds to a respective one of the bits in the first sequence, and determining the at least one difference further comprises determining that a first value of at least one of the bits in the first sequence is different than a second value of a corresponding one of the bits in the second sequence.

(M3) A method may be performed as described in paragraph (M2), wherein determining that the first value is different than the second value further comprises determining first hash values corresponding to first groups of bits in the first sequence; determining second hash values corresponding to second groups of bits in the second sequence; and comparing at least one of the first hash values and at least one of the second hash values.

(M4) A method may be performed as described in any of paragraphs (M1) through (M3), and which further comprises converting the first un-encoded data from a first format having a first number of bits to a second format having a second number of bits; and determining the at least one difference based at least in part on the first un-encoded data in the second format.

(M5) A method may be performed as described in any of paragraphs (M1) through (M4), wherein the first file container, the second file container, and the third file container each conforms to a same digital media file format.

(M6) A method may be performed as described in any of paragraphs (M1) through (M5), and which further comprises determining, within the first un-encoded data, first frames of video data; determining, within the second un-encoded data, second frames of video data; and comparing at least one of the first frames and at least one of the second frames to determine the at least one difference.

(M7) A method may be performed as described in any of paragraphs (M1) through (M6), wherein comparing the at least one of the first frames and the at least one of the second frames further comprises determining first hash values corresponding to the first frames; determining second hash values corresponding to the second frames; and comparing at least one of the first hash values and at least one of the second hash values to determine the at least one difference.

(M8) A method may be performed as described in any of paragraphs (M1) through (M7), wherein determining the at least one difference further comprises determining, within the first un-encoded data, first samples of audio data; determining, within the second un-encoded data, second samples of audio data; and determining the at least one difference based at least in part on at least one of the first samples and at least one of the second samples.

(M9) A method may be performed as described in paragraph (M8), wherein determining the at least one difference further comprises determining first frequency domain spectra corresponding to first groups of the first samples; determining second frequency domain spectra corresponding to second groups of the second samples; and comparing at least one of the first frequency domain spectra and at least one of the second frequency domain spectra to determine the at least one difference.

(M10) A method may be performed as described in any of paragraphs (M1) through (M9), wherein the first file container, the second file container, and the third file container each includes metadata that describes at least one property of an encoding process used to encode each of the first payload, the second payload, and the third payload.

(M11) A method may be performed as described in any of paragraphs (M1) through (M10), wherein the first payload comprises first encoded video data, the second payload comprises second encoded video data, and the third payload comprises third encoded video data.

(M12) A method may be performed as described in any of paragraphs (M1) through (M11), wherein the first payload comprises first encoded audio data, the second payload comprises second encoded audio data, and the third payload comprises third encoded audio data.

(M13) A method may involve determining first payload data included in a first file container, wherein the first payload data represents first non-textual media content, and determining second payload data included in a second file container, wherein the second payload data represents second non-textual media content. At least one difference between the first non-textual media content and second the second non-textual media content may be determined using the first payload data and the second payload data. Third payload data may be determined that represents third non-textual media content corresponding to the at least one difference, and a third file container may be generated that includes the third payload data.

(M14) A method may be performed as described in paragraph (M13), wherein determining the at least one difference further comprises decoding the first payload data to determine first un-encoded data representing the first non-textual media content; decoding the second payload data to determine second un-encoded data representing the second non-textual media content; and comparing the first un-encoded data and the second un-encoded data to determine the at least one difference.

(M15) A method may be performed as described in paragraph (M14), and which further comprises converting the first un-encoded data from a first format having a first number of bits to a second format having a second number of bits; and determining the at least one difference based at least in part on the first un-encoded data in the second format.

(M16) A method may be performed as described in paragraph (M14) or (M15), wherein comparing the first un-encoded data and the second un-encoded data further comprises determining, within the first un-encoded data, first frames of video data determining, within the second un-encoded data, second frames of video data; and comparing at least one of the first frames and at least one of the second frames to determine the at least one difference.

(M17) A method may be performed as described in paragraph (M16), wherein comparing the at least one of the first frames and the at least one of the second frames further comprises determining first hash values corresponding to the first frames; determining second hash values corresponding to the second frames; and comparing at least one of the first hash values and at least one of the second hash values to determine the at least one difference.

(M18) A method may be performed as described in any of paragraphs (M14) through (M17), wherein determining the at least one difference further comprises determining, within the first un-encoded data, first samples of audio data; determining, within the second un-encoded data, second samples of audio data; and determining the at least one difference based at least in part on at least one of the first samples and at least one of the second samples.

(M19) A method may be performed as described in paragraph (M18), wherein determining the at least one difference further comprises determining first frequency domain spectra corresponding to first groups of the first samples; determining second frequency domain spectra corresponding to second groups of the second samples; and comparing at least one of the first frequency domain spectra and at least one of the second frequency domain spectra to determine the at least one difference.

(M20) A method may be performed as described in any of paragraphs (M13) through (M19), wherein the first file container, the second file container, and the third file container each includes metadata that describes at least one property of an encoding process used to encode each of the first payload, the second payload, and the third payload.

(M21) A method may be performed as described in any of paragraphs (M13) through (M20), wherein the first payload comprises first encoded video data, the second payload comprises second encoded video data, and the third payload comprises third encoded video data.

(M22) A method may be performed as described in any of paragraphs (M13) through (M21), wherein the first payload comprises first encoded audio data, the second payload comprises second encoded audio data, and the third payload comprises third encoded audio data.

(M23) A method may be performed as described in any of paragraphs (M13) through (M22), wherein the first file container, the second file container, and the third file container each conforms to a same digital media file format.

The following paragraphs (S1) through (S23) describe examples of systems implemented in accordance with the present disclosure.

(S1) A system may include at least one processor and at least one computer-readable medium encoded with instructions which, when executed by the at least one processor, cause the system to determine first payload data included in a first file container, wherein the first payload data represents first content; to decode the first payload data to determine first un-encoded data representing the first content; to determine second payload data included in a second file container, wherein the second payload data represents second content; to decode the second payload data to determine second un-encoded data representing the second content; to determine at least one difference between the first un-encoded data and the second un-encoded data; to determine third un-encoded data corresponding to the at least one difference; to encode the third un-encoded data to generate third payload data representing third content; and to generate a third file container that includes the third payload data.

(S2) A system may be configured as described in paragraph (S1), and the at least one computer-readable medium may be encoded with additional instructions which, when executed by the at least one processor, further cause the system to determine that a first value of at least one bit in a first sequence of bits is different than a second value of a corresponding bit in a second sequence of bits, wherein the first un-encoded data comprises the first sequence of bits, the second un-encoded data comprises the second sequence of bits, and each of the bits in the second sequence corresponds to a respective one of the bits in the first sequence.

(S3) A system may be configured as described in paragraph (S2), and the at least one computer-readable medium may be encoded with additional instructions which, when executed by the at least one processor, further cause the system to determine that the first value is different than the second value at least by determining first hash values corresponding to first groups of bits in the first sequence; determining second hash values corresponding to second groups of bits in the second sequence; and comparing at least one of the first hash values and at least one of the second hash values.

(S4) A system may be configured as described in any of paragraphs (S1) through (S3), and the at least one computer-readable medium may be encoded with additional instructions which, when executed by the at least one processor, further cause the system to convert the first un-encoded data from a first format having a first number of bits to a second format having a second number of bits; and determine the at least one difference based at least in part on the first un-encoded data in the second format.

(S5) A system may be configured as described in any of paragraphs (S1) through (S4), wherein the first file container, the second file container, and the third file container each conforms to a same digital media file format.

(S6) A system may be configured as described in any of paragraphs (S1) through (S5), and the at least one computer-readable medium may be encoded with additional instructions which, when executed by the at least one processor, further cause the system to determine, within the first un-encoded data, first frames of video data; determine, within the second un-encoded data, second frames of video data; and compare at least one of the first frames and at least one of the second frames to determine the at least one difference.

(S7) A system may be configured as described in any of paragraphs (S1) through (S6), and the at least one computer-readable medium may be encoded with additional instructions which, when executed by the at least one processor, further cause the system to compare the at least one of the first frames and the at least one of the second frames at least by determining first hash values corresponding to the first frames; determining second hash values corresponding to the second frames; and comparing at least one of the first hash values and at least one of the second hash values to determine the at least one difference.

(S8) A system may be configured as described in any of paragraphs (S1) through (S7), and the at least one computer-readable medium may be encoded with additional instructions which, when executed by the at least one processor, further cause the system to determine the at least one difference at least by determining, within the first un-encoded data, first samples of audio data; determining, within the second un-encoded data, second samples of audio data; and determining the at least one difference based at least in part on at least one of the first samples and at least one of the second samples.

(S9) A system may be configured as described in paragraph (S8), and the at least one computer-readable medium may be encoded with additional instructions which, when executed by the at least one processor, further cause the system to determine the at least one difference at least by determining first frequency domain spectra corresponding to first groups of the first samples; determining second frequency domain spectra corresponding to second groups of the second samples; and comparing at least one of the first frequency domain spectra and at least one of the second frequency domain spectra to determine the at least one difference.

(S10) A system may be configured as described in any of paragraphs (S1) through (S9), wherein the first file container, the second file container, and the third file container each includes metadata that describes at least one property of an encoding process used to encode each of the first payload, the second payload, and the third payload.

(S11) A system may be configured as described in any of paragraphs (S1) through (S10), wherein the first payload comprises first encoded video data, the second payload comprises second encoded video data, and the third payload comprises third encoded video data.

(S12) A system may be configured as described in any of paragraphs (S1) through (S11), wherein the first payload comprises first encoded audio data, the second payload comprises second encoded audio data, and the third payload comprises third encoded audio data.

(S13) A system may include at least one processor and at least one computer-readable medium encoded with instructions which, when executed by the at least one processor, cause the system to determine first payload data included in a first file container, wherein the first payload data represents first non-textual media content; to determine second payload data included in a second file container, wherein the second payload data represents second non-textual media content; to determine, using the first payload data and the second payload data, at least one difference between the first non-textual media content and second the second non-textual media content; to determine third payload data that represents third non-textual media content corresponding to the at least one difference; and to generate a third file container that includes the third payload data.

(S14) A system may be configured as described in paragraph (S13), and the at least one computer-readable medium may be encoded with additional instructions which, when executed by the at least one processor, further cause the system to determine the at least one difference at least by decoding the first payload data to determine first un-encoded data representing the first non-textual media content; decoding the second payload data to determine second un-encoded data representing the second non-textual media content; and comparing the first un-encoded data and the second un-encoded data to determine the at least one difference.

(S15) A system may be configured as described in paragraph (S14), and the at least one computer-readable medium may be encoded with additional instructions which, when executed by the at least one processor, further cause the system to convert the first un-encoded data from a first format having a first number of bits to a second format having a second number of bits; and determine the at least one difference based at least in part on the first un-encoded data in the second format.

(S16) A system may be configured as described in paragraph (S14) or (S15), and the at least one computer-readable medium may be encoded with additional instructions which, when executed by the at least one processor, further cause the system to compare the first un-encoded data and the second un-encoded data at least by determining, within the first un-encoded data, first frames of video data determining, within the second un-encoded data, second frames of video data; and comparing at least one of the first frames and at least one of the second frames to determine the at least one difference.

(S17) A system may be configured as described in paragraph (S16), and the at least one computer-readable medium may be encoded with additional instructions which, when executed by the at least one processor, further cause the system to compare the at least one of the first frames and the at least one of the second frames at least by determining first hash values corresponding to the first frames; determining second hash values corresponding to the second frames; and comparing at least one of the first hash values and at least one of the second hash values to determine the at least one difference.

(S18) A system may be configured as described in any of paragraphs (S14) through (S17), and the at least one computer-readable medium may be encoded with additional instructions which, when executed by the at least one processor, further cause the system to determine the at least one difference at least by determining, within the first un-encoded data, first samples of audio data; determining, within the second un-encoded data, second samples of audio data; and determining the at least one difference based at least in part on at least one of the first samples and at least one of the second samples.

(S19) A system may be configured as described in paragraph (S18), and the at least one computer-readable medium may be encoded with additional instructions which, when executed by the at least one processor, further cause the system to determine the at least one difference at least by determining first frequency domain spectra corresponding to first groups of the first samples; determining second frequency domain spectra corresponding to second groups of the second samples; and comparing at least one of the first frequency domain spectra and at least one of the second frequency domain spectra to determine the at least one difference.

(S20) A system may be configured as described in any of paragraphs (S13) through (S19), wherein the first file container, the second file container, and the third file container each includes metadata that describes at least one property of an encoding process used to encode each of the first payload, the second payload, and the third payload.

(S21) A system may be configured as described in any of paragraphs (S13) through (S20), wherein the first payload comprises first encoded video data, the second payload comprises second encoded video data, and the third payload comprises third encoded video data.

(S22) A system may be configured as described in any of paragraphs (S13) through (S21), wherein the first payload comprises first encoded audio data, the second payload comprises second encoded audio data, and the third payload comprises third encoded audio data.

(S23) A system may be configured as described in any of paragraphs (S13) through (S22), wherein the first file container, the second file container, and the third file container each conforms to a same digital media file format.

The following paragraphs (CRM1) through (CRM23) describe examples of computer-readable media implemented in accordance with the present disclosure.

(CRM1) At least one computer-readable medium may be encoded with instructions which, when executed by at least one processor, cause the at least one processor to determine first payload data included in a first file container, wherein the first payload data represents first content; to decode the first payload data to determine first un-encoded data representing the first content; to determine second payload data included in a second file container, wherein the second payload data represents second content; to decode the second payload data to determine second un-encoded data representing the second content; to determine at least one difference between the first un-encoded data and the second un-encoded data; to determine third un-encoded data corresponding to the at least one difference; to encode the third un-encoded data to generate third payload data representing third content; and to generate a third file container that includes the third payload data.

(CRM2) At least one computer-readable medium may be encoded with instructions as described in paragraph (CRM1), and may be further encoded with additional instructions which, when executed by the at least one processor, further cause the at least one processor to determine that a first value of at least one bit in a first sequence of bits is different than a second value of a corresponding bit in a second sequence of bits, wherein the first un-encoded data comprises the first sequence of bits, the second un-encoded data comprises the second sequence of bits, and each of the bits in the second sequence corresponds to a respective one of the bits in the first sequence.

(CRM2) At least one computer-readable medium may be encoded with instructions as described in paragraph (CRM1), and may be further encoded with additional instructions which, when executed by the at least one processor, further cause the at least one processor to determine that a first value of at least one bit in a first sequence of bits is different than a second value of a corresponding bit in a second sequence of bits, wherein the first un-encoded data comprises the first sequence of bits, the second un-encoded data comprises the second sequence of bits, and each of the bits in the second sequence corresponds to a respective one of the bits in the first sequence.

(CRM3) At least one computer-readable medium may be encoded with instructions as described in paragraph (CRM2), and may be further encoded with additional instructions which, when executed by the at least one processor, further cause the at least one processor to determine that the first value is different than the second value at least by determining first hash values corresponding to first groups of bits in the first sequence; determining second hash values corresponding to second groups of bits in the second sequence; and comparing at least one of the first hash values and at least one of the second hash values.

(CRM4) At least one computer-readable medium may be encoded with instructions as described in any of paragraphs (CRM1) through (CRM3), and may be further encoded with additional instructions which, when executed by the at least one processor, further cause the at least one processor to convert the first un-encoded data from a first format having a first number of bits to a second format having a second number of bits; and determine the at least one difference based at least in part on the first un-encoded data in the second format.

(CRM5) At least one computer-readable medium may be encoded with instructions as described in any of paragraphs (CRM1) through (CRM4), wherein the first file container, the second file container, and the third file container each conforms to a same digital media file format.

(CRM6) At least one computer-readable medium may be encoded with instructions as described in any of paragraphs (CRM1) through (CRM5), and may be further encoded with additional instructions which, when executed by the at least one processor, further cause the at least one processor to determine, within the first un-encoded data, first frames of video data; determine, within the second un-encoded data, second frames of video data; and compare at least one of the first frames and at least one of the second frames to determine the at least one difference.

(CRM7) At least one computer-readable medium may be encoded with instructions as described in any of paragraphs (CRM1) through (CRM6), and may be further encoded with additional instructions which, when executed by the at least one processor, further cause the at least one processor to compare the at least one of the first frames and the at least one of the second frames at least by determining first hash values corresponding to the first frames; determining second hash values corresponding to the second frames; and comparing at least one of the first hash values and at least one of the second hash values to determine the at least one difference.

(CRM8) At least one computer-readable medium may be encoded with instructions as described in any of paragraphs (CRM1) through (CRM7), and may be further encoded with additional instructions which, when executed by the at least one processor, further cause the at least one processor to determine the at least one difference at least by determining, within the first un-encoded data, first samples of audio data; determining, within the second un-encoded data, second samples of audio data; and determining the at least one difference based at least in part on at least one of the first samples and at least one of the second samples.

(CRM9) At least one computer-readable medium may be encoded with instructions as described in paragraph (CRM8), and may be further encoded with additional instructions which, when executed by the at least one processor, further cause the at least one processor to determine the at least one difference at least by determining first frequency domain spectra corresponding to first groups of the first samples; determining second frequency domain spectra corresponding to second groups of the second samples; and comparing at least one of the first frequency domain spectra and at least one of the second frequency domain spectra to determine the at least one difference.

(CRM10) At least one computer-readable medium may be encoded with instructions as described in any of paragraphs (CRM1) through (CRM9), wherein the first file container, the second file container, and the third file container each includes metadata that describes at least one property of an encoding process used to encode each of the first payload, the second payload, and the third payload.

(CRM11) At least one computer-readable medium may be encoded with instructions as described in any of paragraphs (CRM1) through (CRM10), wherein the first payload comprises first encoded video data, the second payload comprises second encoded video data, and the third payload comprises third encoded video data.

(CRM12) At least one computer-readable medium may be encoded with instructions as described in any of paragraphs (CRM1) through (CRM11), wherein the first payload comprises first encoded audio data, the second payload comprises second encoded audio data, and the third payload comprises third encoded audio data.

(CRM13) At least one computer-readable medium may be encoded with instructions which, when executed by at least one processor, cause the at least one processor to determine first payload data included in a first file container, wherein the first payload data represents first non-textual media content; to determine second payload data included in a second file container, wherein the second payload data represents second non-textual media content; to determine, using the first payload data and the second payload data, at least one difference between the first non-textual media content and second the second non-textual media content; to determine third payload data that represents third non-textual media content corresponding to the at least one difference; and to generate a third file container that includes the third payload data.

(CRM14) At least one computer-readable medium may be encoded with instructions as described in paragraph (CRM13), and may be further encoded with additional instructions which, when executed by the at least one processor, further cause the at least one processor to determine the at least one difference at least by decoding the first payload data to determine first un-encoded data representing the first non-textual media content; decoding the second payload data to determine second un-encoded data representing the second non-textual media content; and comparing the first un-encoded data and the second un-encoded data to determine the at least one difference.

(CRM15) At least one computer-readable medium may be encoded with instructions as described in paragraph (CRM14), and may be further encoded with additional instructions which, when executed by the at least one processor, further cause the at least one processor to convert the first un-encoded data from a first format having a first number of bits to a second format having a second number of bits; and determine the at least one difference based at least in part on the first un-encoded data in the second format.

(CRM16) At least one computer-readable medium may be encoded with instructions as described in paragraph (CRM14) or (CRM15), and may be further encoded with additional instructions which, when executed by the at least one processor, further cause the at least one processor to compare the first un-encoded data and the second un-encoded data at least by determining, within the first un-encoded data, first frames of video data determining, within the second un-encoded data, second frames of video data; and comparing at least one of the first frames and at least one of the second frames to determine the at least one difference.

(CRM17) At least one computer-readable medium may be encoded with instructions as described in paragraph (CRM16), and may be further encoded with additional instructions which, when executed by the at least one processor, further cause the at least one processor to compare the at least one of the first frames and the at least one of the second frames at least by determining first hash values corresponding to the first frames; determining second hash values corresponding to the second frames; and comparing at least one of the first hash values and at least one of the second hash values to determine the at least one difference.

(CRM18) At least one computer-readable medium may be encoded with instructions as described in any of paragraphs (CRM14) through (CRM17), and may be further encoded with additional instructions which, when executed by the at least one processor, further cause the at least one processor to determine the at least one difference at least by determining, within the first un-encoded data, first samples of audio data; determining, within the second un-encoded data, second samples of audio data; and determining the at least one difference based at least in part on at least one of the first samples and at least one of the second samples.

(CRM19) At least one computer-readable medium may be encoded with instructions as described in paragraph (CRM18), and may be further encoded with additional instructions which, when executed by the at least one processor, further cause the at least one processor to determine the at least one difference at least by determining first frequency domain spectra corresponding to first groups of the first samples; determining second frequency domain spectra corresponding to second groups of the second samples; and comparing at least one of the first frequency domain spectra and at least one of the second frequency domain spectra to determine the at least one difference.

(CRM20) At least one computer-readable medium may be encoded with instructions as described in any of paragraphs (CRM13) through (CRM19), wherein the first file container, the second file container, and the third file container each includes metadata that describes at least one property of an encoding process used to encode each of the first payload, the second payload, and the third payload.

(CRM21) At least one computer-readable medium may be encoded with instructions as described in any of paragraphs (CRM13) through (CRM20), wherein the first payload comprises first encoded video data, the second payload comprises second encoded video data, and the third payload comprises third encoded video data.

(CRM22) At least one computer-readable medium may be encoded with instructions as described in any of paragraphs (CRM13) through (CRM21), wherein the first payload comprises first encoded audio data, the second payload comprises second encoded audio data, and the third payload comprises third encoded audio data.

(CRM23) At least one computer-readable medium may be encoded with instructions as described in any of paragraphs (CRM13) through (CRM22), wherein the first file container, the second file container, and the third file container each conforms to a same digital media file format.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    determining first payload data included in a first media file container, wherein the first payload data represents first content;
    decoding the first payload data to determine first un-encoded data representing the first content;
    determining second payload data included in a second media file container, wherein the second payload data represents second content;
    decoding the second payload data to determine second un-encoded data representing the second content;
    determining at least one difference between the first un-encoded data and the second un-encoded data;
    determining third un-encoded data corresponding to the at least one difference;
    encoding the third un-encoded data to generate third payload data representing third content; and
    generating a third media file container that includes the third payload data, wherein the third media file container is formatted to enable a media player or viewer to use the third media file container, without accessing any other media file containers, to cause a computing device to output the third content based on the third payload data.

2. The method of claim 1, wherein the first un-encoded data comprises a first sequence of bits, the second un-encoded data comprises a second sequence of bits, each of the bits in the second sequence corresponds to a respective one of the bits in the first sequence, and determining the at least one difference further comprises:
    determining that a first value of at least one of the bits in the first sequence is different than a second value of a corresponding one of the bits in the second sequence.

3. The method of claim 2, wherein determining that the first value is different than the second value further comprises:
    determining first hash values corresponding to first groups of bits in the first sequence;
    determining second hash values corresponding to second groups of bits in the second sequence; and
    comparing at least one of the first hash values and at least one of the second hash values.

4. The method of claim 1, further comprising:
    converting the first un-encoded data from a first format having a first number of bits to a second format having a second number of bits; and
    determining the at least one difference based at least in part on the first un-encoded data in the second format.

5. The method of claim 1, wherein the first media file container, the second media file container, and the third media file container each conforms to a same digital media file format.

6. The method of claim 1, wherein determining the at least one difference further comprises:
    determining, within the first un-encoded data, first frames of video data;
    determining, within the second un-encoded data, second frames of video data; and
    comparing at least one of the first frames and at least one of the second frames to determine the at least one difference.

7. The method of claim 6, wherein comparing the at least one of the first frames and the at least one of the second frames further comprises:
    determining first hash values corresponding to the first frames;
    determining second hash values corresponding to the second frames; and
    comparing at least one of the first hash values and at least one of the second hash values to determine the at least one difference.

8. The method of claim 1, wherein determining the at least one difference further comprises:
    determining, within the first un-encoded data, first samples of audio data;
    determining, within the second un-encoded data, second samples of audio data; and
    determining the at least one difference based at least in part on at least one of the first samples and at least one of the second samples.

9. At least one non-transitory computer-readable medium encoded with instructions which, when executed by at least one processor, cause the at least one processor to:
    determine first payload data included in a first media file container, wherein the first payload data represents first content;
    decode the first payload data to determine first un-encoded data representing the first content;
    determine second payload data included in a second media file container, wherein the second payload data represents second content;
    decode the second payload data to determine second un-encoded data representing the second content;
    determine at least one difference between the first un-encoded data and the second un-encoded data;
    determine third un-encoded data corresponding to the at least one difference;
    encode the third un-encoded data to generate third payload data representing third content; and
    generate a third media file container that includes the third payload data, wherein the third media file container is formatted to enable a media player or viewer to use the third media file container, without accessing any other media file containers, to cause a computing device to output the third content based on the third payload data.

10. At least one non-transitory computer-readable medium of claim 9, encoded with additional instructions which, when executed by the at least one processor, further cause the at least one processor to determine the at least one difference at least by:
    determining that a first value of at least one bit in a first sequence of bits is different than a second value of a corresponding bit in a second sequence of bits, wherein the first un-encoded data comprises the first sequence of bits, the second un-encoded data comprises the second sequence of bits, and each of the bits in the second sequence corresponds to a respective one of the bits in the first sequence.

11. At least one non-transitory computer-readable medium of claim 10, encoded with additional instructions which, when executed by the at least one processor, further cause the at least one processor to determine that the first value is different than the second value at least by:
    determining first hash values corresponding to first groups of bits in the first sequence;
    determining second hash values corresponding to second groups of bits in the second sequence; and
    comparing at least one of the first hash values and at least one of the second hash values.

12. At least one non-transitory computer-readable medium of claim 9, encoded with additional instructions which, when executed by the at least one processor, further cause the at least one processor to:

convert the first un-encoded data from a first format having a first number of bits to a second format having a second number of bits; and determine the at least one difference based at least in part on the first un-encoded data in the second format.

13. At least one non-transitory computer-readable medium of claim 9, encoded with additional instructions which, when executed by the at least one processor, further cause the at least one processor to determine the at least one difference at least by:

determining, within the first un-encoded data, first frames of video data;

determining, within the second un-encoded data, second frames of video data; and comparing at least one of the first frames and at least one of the second frames to determine the at least one difference.

14. At least one non-transitory computer-readable medium of claim 13, encoded with additional instructions which, when executed by the at least one processor, further cause the at least one processor to compare the at least one of the first frames and the at least one of the second frames at least by:

determining first hash values corresponding to the first frames;

determining second hash values corresponding to the second frames; and comparing at least one of the first hash values and at least one of the second hash values.

15. At least one non-transitory computer-readable medium of claim 9, encoded with additional instructions which, when executed by the at least one processor, further cause the at least one processor to determine the at least one difference at least by:

determining, within the first un-encoded data, first samples of audio data;

determining, within the second un-encoded data, second samples of audio data; and determining the at least one difference based at least in part on at least one of the first samples and at least one of the second samples.

16. A method, comprising:

determining first payload data included in a first media file container, wherein the first payload data represents first non-textual media content;

determining second payload data included in a second media file container, wherein the second payload data represents second non-textual media content;

determining, using the first payload data and the second payload data, at least one difference between the first non-textual media content and second the second non-textual media content;

determining third payload data that represents third non-textual media content corresponding to the at least one difference; and generating a third media file container that includes the third payload data, wherein the third media file container is formatted to enable a media player or viewer to use the third media file container, without accessing any other media file containers, to cause a computing device to output the third non-textual media content based on the third payload data.

17. The method of claim 16, wherein determining the at least one difference further comprises:

decoding the first payload data to determine first un-encoded data representing the first non-textual media content;

decoding the second payload data to determine second un-encoded data representing the second non-textual media content; and comparing the first un-encoded data and the second un-encoded data to determine the at least one difference.

18. The method of claim 17, wherein comparing the first un-encoded data and the second un-encoded data further comprises:

determining, within the first un-encoded data, first frames of video data;

determining, within the second un-encoded data, second frames of video data; and comparing at least one of the first frames and at least one of the second frames to determine the at least one difference.

19. The method of claim 18, wherein comparing the at least one of the first frames and the at least one of the second frames further comprises:

determining first hash values corresponding to the first frames;

determining second hash values corresponding to the second frames; and comparing at least one of the first hash values and at least one of the second hash values to determine the at least one difference.

20. The method of claim 17, wherein determining the at least one difference further comprises:

determining, within the first un-encoded data, first samples of audio data;

determining, within the second un-encoded data, second samples of audio data; and determining the at least one difference based at least in part on at least one of the first samples and at least one of the second samples.

* * * * *